US012748954B2

(12) United States Patent
Batra et al.

(10) Patent No.: US 12,748,954 B2
(45) Date of Patent: Sep. 29, 2026

(54) DATA IMPUTATION USING AN INTERCONNECTED VARIATIONAL AUTOENCODER MODEL

(71) Applicant: Optum, Inc., Minnetonka, MN (US)

(72) Inventors: Sanjit S. Batra, Redwood City, CA (US); Robert E. Tillman, Long Island City, NY (US); Brian Lawrence Hill, Culver City, CA (US); Eran Halperin, Santa Monica, CA (US); Josue Ramon Nassar, Syosset, NY (US)

(73) Assignee: Optum, Inc., Minnetonka, MN (US)

( * ) Notice: Subject to any disclaimer, the term of this patent is extended or adjusted under 35 U.S.C. 154(b) by 498 days.

(21) Appl. No.: 18/446,971

(22) Filed: Aug. 9, 2023

(65) Prior Publication Data

US 2024/0169185 A1 May 23, 2024

Related U.S. Application Data

(60) Provisional application No. 63/427,761, filed on Nov. 23, 2022.

(51) Int. Cl.
*G06N 3/0455* (2023.01)

(52) U.S. Cl.
CPC .................................. *G06N 3/0455* (2023.01)

(58) Field of Classification Search
CPC ...... G06N 3/0455; G06N 20/00; G06N 3/088; G06N 3/047
See application file for complete search history.

(56) References Cited

U.S. PATENT DOCUMENTS

| | | | | |
|---|---|---|---|---|
| 9,785,983 | B2 | 10/2017 | Zhao et al. | |
| 10,133,727 | B2 | 11/2018 | Karres et al. | |
| 10,147,504 | B1 | 12/2018 | Stettin et al. | |
| 10,437,936 | B2 | 10/2019 | DeFelice | |
| 10,535,430 | B1 | 1/2020 | Fischer et al. | |
| 10,853,728 | B1 * | 12/2020 | Walters ................ | G06N 3/0455 707/737 |
| 11,586,915 | B2 * | 2/2023 | Macready ............ | G06N 3/0455 707/737 |
| 2020/0245009 | A1 * | 7/2020 | Saini ........................ | G06N 3/09 707/737 |
| 2020/0372369 | A1 | 11/2020 | Gong et al. | |

(Continued)

OTHER PUBLICATIONS

Zhong et al. "Multiple-Inputmultiple-Outputfusionnetworkforgeneralized Zero-Shotlearning", 2021.*

(Continued)

*Primary Examiner* — Yuk Ting Choi
(74) *Attorney, Agent, or Firm* — ALSTON & BIRD LLP

(57) ABSTRACT

Embodiments of the present disclosure provide for improved data processing using interconnected variational autoencoder models, which may be used for any of a myriad of purposes. Some embodiments specially train the interconnected variational autoencoder models by utilizing different training scenarios corresponding to presence and/or absence of particular data in a training data set. Particular encoder(s) and/or decoder(s) from the specially trained interconnected variational autoencoder models may then be utilized to improve accuracy of the desired data processing tasks, for example, to generate particular output data.

20 Claims, 14 Drawing Sheets

(56) References Cited

U.S. PATENT DOCUMENTS

| | | | | |
|---|---|---|---|---|
| 2020/0394559 | A1 | 12/2020 | Zhang et al. | |
| 2021/0358577 | A1 | 11/2021 | Zhang et al. | |
| 2022/0087230 | A1* | 3/2022 | Zhang | G06N 3/0475 707/737 |
| 2023/0048764 | A1* | 2/2023 | Zheng | G16H 50/70 707/737 |
| 2023/0072255 | A1* | 3/2023 | Klein | G06N 3/0455 707/737 |

OTHER PUBLICATIONS

Barrejon, et al., "Medical Data Wrangling with Sequential Variational Autoencoders", IEEE Journal of Biomedical and Health Informatics, Nov. 8, 2021, (9 pages), arXiv:2103.07206v2.
Li, et al., "Causal-Aware Generative Imputation for Automated Underwriting", Proceedings of the 30th ACM International Conference on Information & Knowledge Management, pp. 3916-3924, Nov. 5, 2021, (9 pages), retrieved at https://opus.lib.uts.edu.au/rest/bitstreams/988c4c73-96ba-446f-b309-cf803fe9a95e/retrieve.
Li, et al., "Inferring Multimodal Latent Topics from Electronic Health Records", Nature Communications, vol. 11:2536, May 21, 2020, (17 pages), doi.org/10.1038/s41467-020-16378-3.

* cited by examiner

DATA IMPUTATION USING AN INTERCONNECTED VARIATIONAL AUTOENCODER MODEL

CROSS REFERENCE TO RELATED APPLICATIONS

This application claims the benefit of priority to U.S. Provisional Application No. 63/427,761, filed Nov. 23, 2022, the content of which is incorporated by reference herein in its entirety.

TECHNICAL FIELD

Embodiments of the present disclosure are generally related to machine learning model training techniques, and specifically to particular training methodologies and uses of autoencoders to improve data processing performed via at least a portion of the autoencoders.

BACKGROUND

Machine learning models are utilized in an attempt to solve a particular data learning task. In various contexts, however, the data utilized to configure and/or otherwise train such machine learning models may be insufficient or otherwise may be incomplete. A user may not be able to control such missing or otherwise incomplete data, however, and/or a user may be unable to accurately process data in view of the problem of missing data in various contexts. In this regard, machine learning models in such contexts may be trained without consideration of the missing data values.

Applicant has discovered problems and/or inefficiencies with current implementations for training models, particular autoencoders and/or sub-models thereof, for particular tasks that possibly involve missing data value. Through applied effort, ingenuity, and innovation, Applicant has solved many of these identified problems by developing solutions embodied in the present disclosure, which are described in detail below.

BRIEF SUMMARY

In one aspect, a computer-implemented method includes receiving, by one or more processors, at least a training data set. The computer-implemented method also includes training, by the one or more processors, a pair of interconnected variational autoencoder models includes at least a first variational autoencoder model interconnected at least in part with a second variational autoencoder model, where the first variational autoencoder model includes at least a claims encoder and at least a code decoder, and where the second variational autoencoder model includes at least a clinical encoder and a non-code decoder. Training the pair of interconnected variational autoencoder models includes at least one of various training scenarios, for example, (I) in a circumstance where the training data set includes a set of claims data and not a set of clinical data training, by the one or more processors, the claims encoder based on the set of claims data, where the claims encoder updates code embedding data, and training, by the one or more processors, the code decoder based on the code embedding data generated by the claims encoder, (II) in a circumstance where the training data set includes the set of clinical data and not the set of claims data, and training, by the one or more processors, the clinical encoder based on the set of clinical data, where the clinical encoder updates the code embedding data and non-code embedding data, and training the code decoder based on the code embedding data, and training, by the one or more processors, the non-code decoder based on the code embedding data, and/or (III) in a circumstance where the training data set includes the set of claims data and the set of clinical data training, by the one or more processors, the clinical encoder based on the set of clinical data, where the clinical encoder updates the code embedding data and non-code embedding data, and training, by the one or more processors, the claims encoder based on the set of claims data, where the claims encoder updates the code embedding data, and training, by the one or more processors, the code decoder based on the code embedding data, and training, by the one or more processors, the non-code decoder based on the code embedding data and the non-code embedding data, where the code embedding data is shared between the claims encoder and the clinical encoder. The computer-implemented method also includes generating, by the one or more processors, output data based on the clinical encoder and the code decoder.

In accordance with another aspect of the disclosure, an apparatus is provided. An example apparatus includes at least one processor and at least one memory, the at least one memory having computer-coded instructions stored thereon that, in execution with the at least one processor, causes the apparatus to perform any one of the example computer-implemented methods described herein.

In accordance with another aspect of the disclosure, a computer program product is provided. An example computer program product includes at least one non-transitory computer-readable storage medium having computer program code stored thereon that, in execution with at least one processor, configures the computer program product for performing any one of the example computer-implemented methods described herein.

Other technical features may be readily apparent to one skilled in the art from the following figures, descriptions, and claims.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
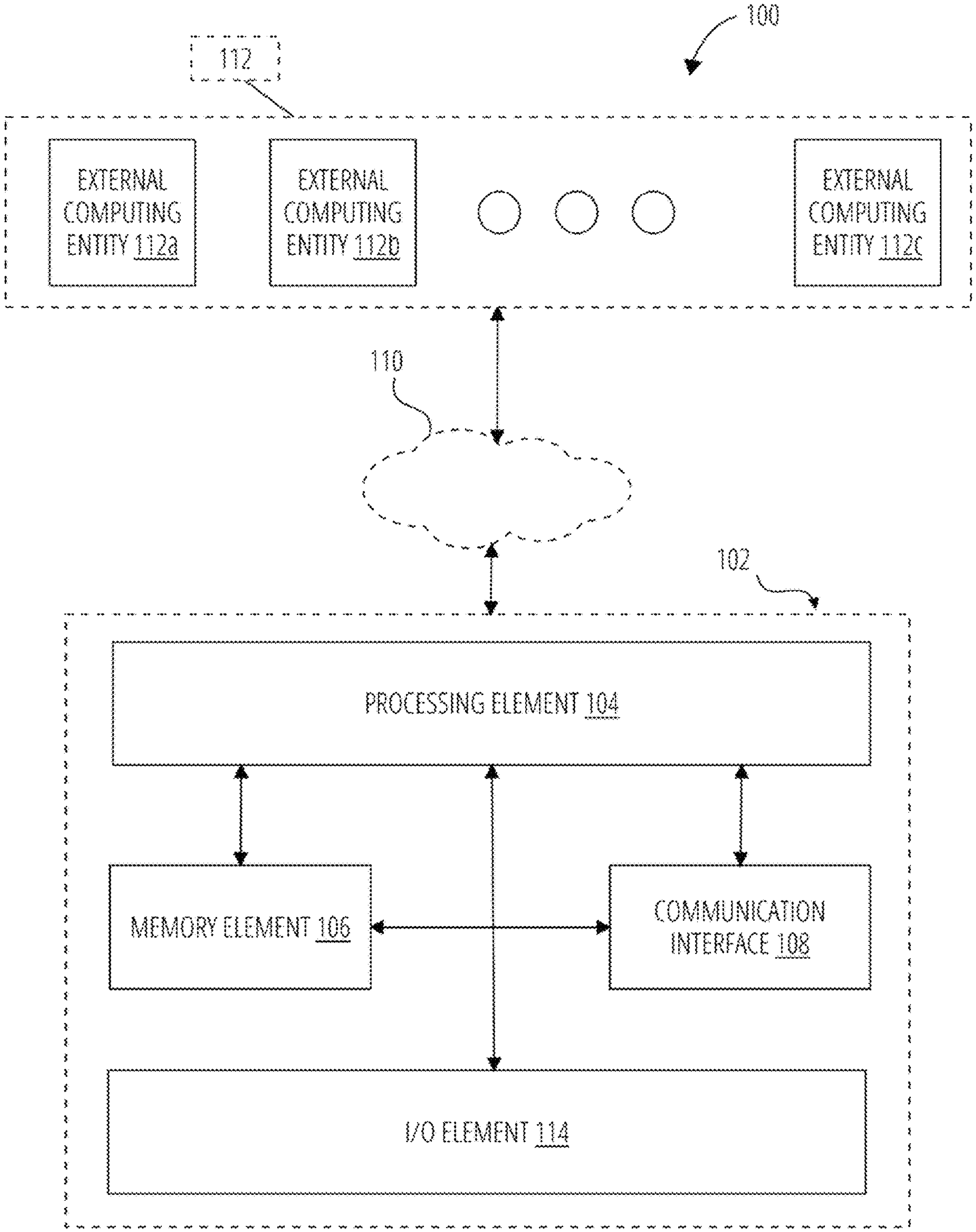
FIG. 1 illustrates an example computing system in accordance with at least one embodiment of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not indicate being based only on or based solely on the referenced element or elements unless so indicated. Like numbers refer to like elements throughout.

I. Computer Program Products, Methods, and Computing Entities

Embodiments of the present disclosure can be implemented in various ways, including as computer program products that comprise articles of manufacture. Such computer program products can include one or more software components including, for example, software objects, methods, data structures, or the like. A software component can be coded in any of a variety of programming languages. An illustrative programming language can be a lower-level programming language such as an assembly language associated with a particular hardware architecture and/or operating system platform. A software component comprising assembly language instructions can require conversion into executable machine code by an assembler prior to execution by the hardware architecture and/or platform. Another example programming language can be a higher-level programming language that can be portable across multiple architectures. A software component comprising higher-level programming language instructions can require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages can be executed directly by an operating system or other software component without having to be first transformed into another form. A software component can be stored as a file or other data storage construct. Software components of a similar type or functionally related can be stored together such as, for example, in a particular directory, folder, or library. Software components can be static (e.g., pre-established, or fixed) or dynamic (e.g., created or modified at the time of execution).

A computer program product can include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium can include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium can also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium can also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium can also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium can include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media can be substituted for or used in addition to the computer-readable storage media described above.

As should be appreciated, various embodiments of the present disclosure can also be implemented as methods, apparatus, systems, computing devices, computing entities, and/or the like. As such, embodiments of the present disclosure can take the form of an apparatus, system, computing device, computing entity, and/or the like executing instructions stored on a non-transitory computer-readable storage medium to perform certain steps or operations. Thus, embodiments of the present disclosure can also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations can be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a non-transitory computer-readable storage medium for execution. For example, retrieval, loading, and execution of code can be performed sequentially such that one instruction is retrieved, loaded, and executed at a time. In some exemplary embodiments, retrieval, loading, and/or execution can be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

II. Example Framework

FIG. 1 illustrates an example computing system 100 in accordance with one or more embodiments of the present disclosure. The computing system 100 may include a predictive computing entity 102 and/or one or more external computing entities 112*a-c* communicatively coupled to the predictive computing entity 102 using one or more wired and/or wireless communication techniques. The predictive computing entity 102 may be specially configured to perform one or more steps/operations of one or more prediction techniques described herein. In some embodiments, the predictive computing entity 102 may include and/or be in association with one or more mobile device(s), desktop computer(s), laptop(s), server(s), cloud computing platform (s), and/or the like. In some example embodiments, the predictive computing entity 102 may be configured to receive and/or transmit one or more data objects from and/or to the external computing entities 112*a-c* to perform one or more steps/operations of one or more prediction techniques described herein.

The external computing entities 112*a-c*, for example, may include and/or be associated with one or more data centers. The data centers, for example, may be associated with one or more data repositories storing data that may, in some circumstances, be processed by the predictive computing entity 102 to provide dashboard(s), machine learning analytic(s), and/or the like. By way of example, the external computing entities 112*a-c* may be associated with a plurality of entities. A first example external computing entity 112*a*, for example, may host a registry for the entities. By way of example, in some example embodiments, the entities may include one or more service providers and the external computing entity 112*a* may host a registry (e.g., the national provider identifier registry, and/or the like) including one or more clinical profiles for the service providers. Additionally or alternatively, in some embodiments, the external computing entity 112*a* may include service provider data indicative of medical encounters serviced by the service provider, for example, including patient data, CPT and/or diagnosis data, and/or the like. In addition, or alternatively, a second example external computing entity 112*b* may include one or more claim processing entities that may receive, store, and/or have access to a historical interaction data set for the entities. In this regard, the external computing entity 112*b* may include such patient data, CPT and/or diagnosis data, claims data, other code data, and/or the like for any of a number of medical encounters. In some embodiments, the external computing entity 112*b* embodies one or more computing system(s) that support operations of an insurance or other healthcare-related entity. In some embodiments, a third example external computing entity 112*c* may include a data processing entity that may preprocess the historical interaction data set to generate one or more data objects descriptive of one or more aspects of the historical interaction data set. Additionally or alternatively, in some embodiments, the external computing entities includes an external computing entity embodying a central data warehouse associated with one or more other external computing entities, for example, where the central data warehouse aggregates data across a myriad of other data sources. Additionally or alternatively, in some embodiments, the external computing entities includes an external computing entity embodying a user device or system that collect(s) user health and/or biometric data. In some embodiments, the external computing entities 112*a*-112*c* embody particular data sources for data record(s) embodying or included in a training data set.

The predictive computing entity 102 may include, or be in communication with, one or more processing elements 104 (also referred to as processors, processing circuitry, digital circuitry, and/or similar terms used herein interchangeably)

that communicate with other elements within the predictive computing entity 102 via a bus, for example. As will be understood, the predictive computing entity 102 may be embodied in a number of different ways. The predictive computing entity 102 may be configured for a particular use or configured to execute instructions stored in volatile or non-volatile media or otherwise accessible to the processing element 104. As such, whether configured by hardware or computer program products, or by a combination thereof, the processing element 104 may be capable of performing steps or operations according to embodiments of the present disclosure when configured accordingly. For example, in some embodiments, the predictive computing entity 102 is configured to perform specialized training of one or more machine-learning variational autoencoder model(s) as described herein, for example, interconnected variational autoencoder models. Additionally or alternatively, in some embodiments, the predictive computing entity 102 is configured to utilize such specially-trained machine learning models to generate data utilizing specially-trained machine learning models.

In one embodiment, the predictive computing entity 102 may further include, or be in communication with, one or more memory elements 106. The memory element 106 may be used to store at least portions of the databases, database instances, database management systems, data, applications, programs, program modules, scripts, source code, object code, byte code, compiled code, interpreted code, machine code, executable instructions, and/or the like being executed by, for example, the processing element 104. Thus, the databases, database instances, database management systems, data, applications, programs, program modules, scripts, source code, object code, byte code, compiled code, interpreted code, machine code, executable instructions, and/or the like may be used to control certain aspects of the operation of the predictive computing entity 102 with the assistance of the processing element 104.

As indicated, in one embodiment, the predictive computing entity 102 may also include one or more communication interfaces 108 for communicating with various computing entities such as the external computing entities 112*a-c*, such as by communicating data, content, information, and/or similar terms used herein interchangeably that may be transmitted, received, operated on, processed, displayed, stored, and/or the like.

The computing system 100 may include one or more input/output (I/O) element(s) 114 for communicating with one or more users. An I/O element 114, for example, may include one or more user interfaces for providing and/or receiving information from one or more users of the computing system 100. The I/O element 114 may include one or more tactile interfaces (e.g., keypads, touch screens, etc.), one or more audio interfaces (e.g., microphones, speakers, etc.), visual interfaces (e.g., display devices, etc.), and/or the like. The I/O element 114 may be configured to receive user input through one or more of the user interfaces from a user of the computing system 100 and provide data to a user through the user interfaces.

Figure 2:
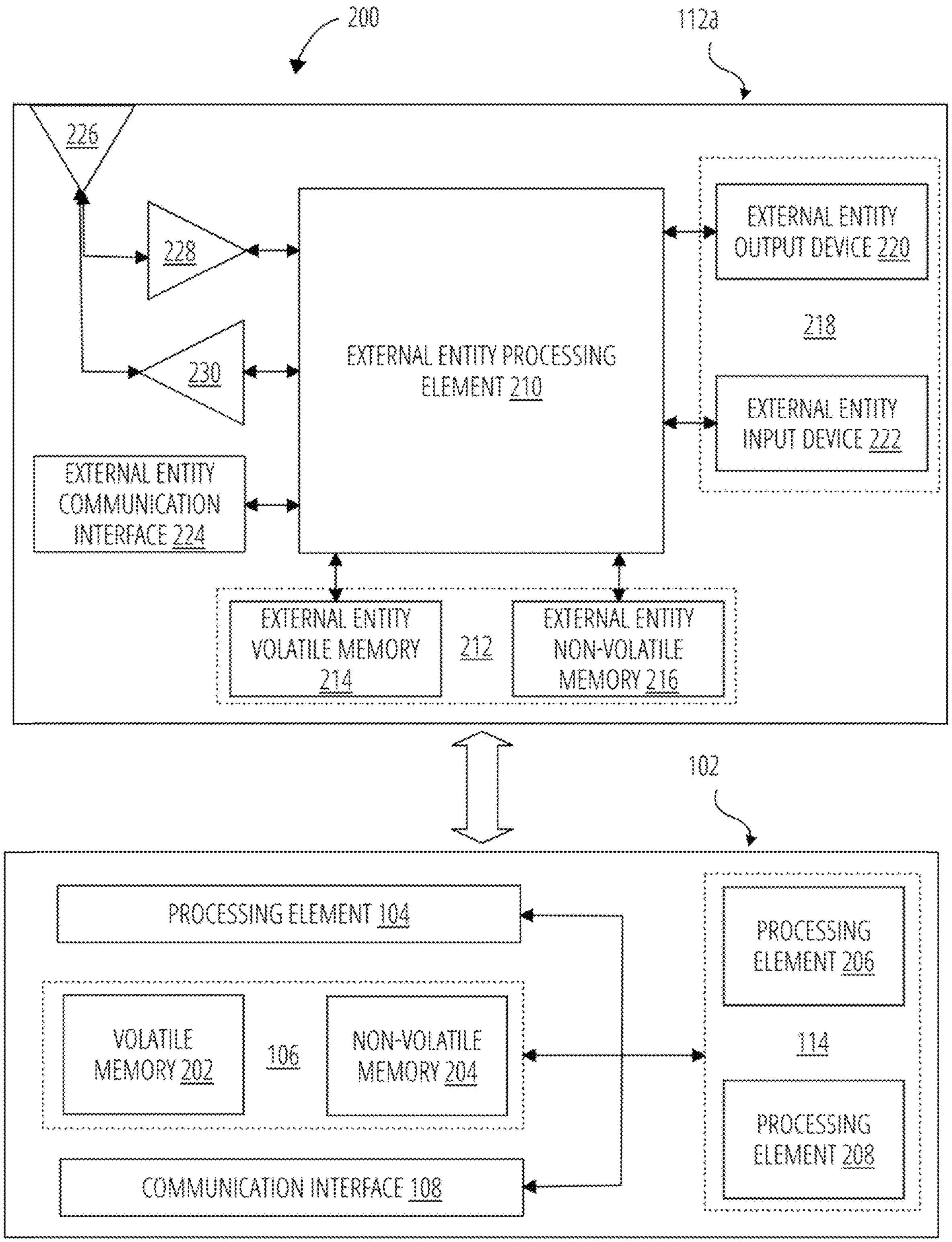
FIG. 2 illustrates a schematic diagram showing a system computing architecture in accordance with at least one embodiment of the present disclosure.

FIG. 2 is a schematic diagram showing a system computing architecture 200 in accordance with some embodiments discussed herein. In some embodiments, the system computing architecture 200 may include the predictive computing entity 102 and/or the external computing entity 112*a* of the computing system 100. The predictive computing entity 102 and/or the external computing entity 112*a* may include a computing apparatus, a computing device, and/or any form of computing entity configured to execute instructions stored on a computer-readable storage medium to perform certain steps or operations.

The predictive computing entity 102 may include a processing element 104, a memory element 106, a communication interface 108, and/or one or more I/O elements 114 that communicate within the predictive computing entity 102 via internal communication circuitry such as a communication bus, and/or the like.

The processing element 104 may be embodied as one or more complex programmable logic devices (CPLDs), microprocessors, multi-core processors, coprocessing entities, application-specific instruction-set processors (ASIPs), microcontrollers, and/or controllers. Further, the processing element 104 may be embodied as one or more other processing devices or circuitry including, for example, a processor, one or more processors, various processing devices and/or the like. The term circuitry may refer to an entirely hardware embodiment or a combination of hardware and computer program products. Thus, the processing element 104 may be embodied as integrated circuits, application specific integrated circuits (ASICs), field programmable gate arrays (FPGAs), programmable logic arrays (PLAs), hardware accelerators, digital circuitry, and/or the like.

The memory element 106 may include volatile memory 202 and/or non-volatile memory 204. The memory element 106, for example, may include volatile memory 202 (also referred to as volatile storage media, memory storage, memory circuitry and/or similar terms used herein interchangeably). In one embodiment, a volatile memory 202 may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

The memory element 106 may include non-volatile memory 204 (also referred to as non-volatile storage, memory, memory storage, memory circuitry and/or similar terms used herein interchangeably). In one embodiment, the non-volatile memory 204 may include one or more non-volatile storage or memory media, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

In one embodiment, a non-volatile memory 204 may include a floppy disk, flexible disk, hard disk, solid-state storage (SSS) (e.g., a solid-state drive (SSD)), solid state card (SSC), solid state module (SSM), enterprise flash drive, magnetic tape, or any other non-transitory magnetic medium, and/or the like. A non-volatile memory 204 may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile memory 204 may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

As will be recognized, the non-volatile memory 204 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

The memory element 106 may include a non-transitory computer-readable storage medium for implementing one or more aspects of the present disclosure including as a computer-implemented method configured to perform one or more steps/operations described herein. For example, the non-transitory computer-readable storage medium may include instructions that when executed by a computer (e.g., processing element 104), cause the computer to perform one or more steps/operations of the present disclosure. For instance, the memory element 106 may store instructions that, when executed by the processing element 104, configure the predictive computing entity 102 to perform one or more step/operations described herein.

Implementations of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as in a particular directory, folder, or library. Software components may be static (e.g., pre-established, or fixed) or dynamic (e.g., created, or modified at the time of execution).

The predictive computing entity 102 may be embodied by a computer program product include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media such as the volatile memory 202 and/or the non-volatile memory 204.

The predictive computing entity 102 may include one or more I/O elements 114. The I/O elements 114 may include one or more output devices 206 and/or one or more input devices 208 for providing and/or receiving information with a user, respectively. The output devices 206 may include one or more sensory output devices such as one or more tactile output devices (e.g., vibration devices such as direct current motors, and/or the like), one or more visual output devices (e.g., liquid crystal displays, and/or the like), one or more audio output devices (e.g., speakers, and/or the like), and/or the like. The input devices 208 may include one or more sensory input devices such as one or more tactile input devices (e.g., touch sensitive displays, push buttons, and/or the like), one or more audio input devices (e.g., microphones, and/or the like), and/or the like.

In addition, or alternatively, the predictive computing entity 102 may communicate, via a communication interface 108, with one or more external computing entities such as the external computing entity **112*a*. The communication interface 108** may be compatible with one or more wired and/or wireless communication protocols.

For example, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. In addition, or alternatively, the predictive computing entity 102 may be configured to communicate via wireless external communication using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 302.9 (Wi-Fi), Wi-Fi Direct, 302.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

The external computing entity 112*a* may include an external entity processing element 210, an external entity memory element 212, an external entity communication interface 224, and/or one or more external entity I/O elements 218 that communicate within the external computing entity 112*a* via internal communication circuitry such as a communication bus, and/or the like.

The external entity processing element 210 may include one or more processing devices, processors, and/or any other device, circuitry, and/or the like described with reference to the processing element 104. The external entity memory element 212 may include one or more memory devices, media, and/or the like described with reference to the memory element 106. The external entity memory element 212, for example, may include at least one external entity volatile memory 214 and/or external entity non-volatile memory 216. The external entity communication interface 224 may include one or more wired and/or wireless communication interfaces as described with reference to communication interface 108.

In some embodiments, the external entity communication interface 224 may be supported by one or more radio circuitry. For instance, the external computing entity 112*a* may include an antenna 226, a transmitter 228 (e.g., radio), and/or a receiver 230 (e.g., radio).

Signals provided to and received from the transmitter 228 and the receiver 230, correspondingly, may include signaling information/data in accordance with air interface standards of applicable wireless systems. In this regard, the external computing entity 112*a* may be capable of operating with one or more air interface standards, communication protocols, modulation types, and access types. More particularly, the external computing entity 112*a* may operate in accordance with any of a number of wireless communication standards and protocols, such as those described above with regard to the predictive computing entity 102.

Via these communication standards and protocols, the external computing entity 112*a* may communicate with various other entities using means such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 112*a* may also download changes, add-ons, and updates, for instance, to its firmware, software (e.g., including executable instructions, applications, program modules), operating system, and/or the like.

According to one embodiment, the external computing entity 112*a* may include location determining embodiments, devices, modules, functionalities, and/or the like. For example, the external computing entity 112*a* may include outdoor positioning embodiments, such as a location module adapted to acquire, for example, latitude, longitude, altitude, geocode, course, direction, heading, speed, universal time (UTC), date, and/or various other information/data. In one embodiment, the location module may acquire data such as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating a position of the external computing entity 112*a* in connection with a variety of other systems, including cellular towers, Wi-Fi access points, and/or the like. Similarly, the external computing entity 112*a* may include indoor positioning embodiments, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning embodiments may be used in a variety of settings to determine the location of someone or something to within inches or centimeters.

The external entity I/O elements 218 may include one or more external entity output devices 220 and/or one or more external entity input devices 222 that may include one or more sensory devices described herein with reference to the I/O elements 114. In some embodiments, the external entity I/O element 218 may include a user interface (e.g., a display, speaker, and/or the like) and/or a user input interface (e.g., keypad, touch screen, microphone, and/or the like) that may be coupled to the external entity processing element 210.

For example, the user interface may be a user application, browser, and/or similar words used herein interchangeably executing on and/or accessible via the external computing entity 112*a* to interact with and/or cause the display, announcement, and/or the like of information/data to a user. The user input interface may include any of a number of input devices or interfaces allowing the external computing entity 112*a* to receive data including, as examples, a keypad (hard or soft), a touch display, voice/speech interfaces, motion interfaces, and/or any other input device. In embodiments including a keypad, the keypad may include (or cause display of) the conventional numeric (0-9) and related keys (#, *, and/or the like), and other keys used for operating the external computing entity 112*a* and may include a full set of alphabetic keys or set of keys that may be activated to provide a full set of alphanumeric keys. In addition to providing input, the user input interface may be used, for example, to activate or deactivate certain functions, such as screen savers, sleep modes, and/or the like.

III. Overview, Technical Improvements, and Technical Advantages

In various contexts, data sets are processed by machine learning models to perform a particular data processing task. In some such contexts, multiple types of data sets are processed by such models, for example, clinical data and/or code data associated with healthcare event(s) for one or more patients. In this example context, a particular healthcare event may produce the multiple types of data portions, for example, both clinical data and claims data. In the context of a healthcare event, the generated clinical data and claims data should share at least a common set of code data representing diagnosis, procedure, prescription, treatment, or other codes associated with the healthcare event. Additionally or alternatively, in some embodiments, the clinical data and the claims data may include any other common set of data types, where one of the data sets (e.g., the claims data) is determined or otherwise known to be more complete than the other data set (e.g., the clinical data). In some circumstances, however, the data sets made available to a particular system may be incomplete. For example, in some contexts, a provider does not share clinical notes, a provider judges that a claim or code is not important enough to include in a patient's record, due to a technical or other communication error, and/or the like, resulting in the incomplete data set for training and/or processing. However, due to the nature of such data, a system may not be able to determine whether the data set is complete or incomplete, and similarly cannot determine what data is missing from the particular data set. In the context of healthcare events and corresponding data, for example, a particular data set may be made available to a system that lacks access to clinical data, claims data, or portion(s) thereof.

This lacking of data causes various technical problems associated with training and/or using particular machine learning models. For example, in various contexts it is desirable to train one or more model(s) based on all such available data. In some such contexts, missing data in the data sets hinders performance of training such model(s). In some other contexts, for example, where a training data set includes only a small sub-set of data that includes all/both types of data (e.g., under 10% of the complete training data set), the number of training samples from which data trend (s), pattern(s), and/or other learning(s) derivable from such missing code is insufficient to enable such learnings or such learnings may be overwhelmed by the other portions of training data. Additionally or alternatively, training based on any of such data associated with a particular patient and corresponding healthcare event(s), a high-level of risk associated with patient identification and other privacy exposure. Any attempt to resolve such privacy concerns, however, ideally must do so without diminishing the accuracy of the models and while simultaneously being representative of the actual population of entities associated with the training data set (e.g., a population of patients for which data is collected).

Embodiments of the present disclosure provide for various technical advantages. Some embodiments utilize training mechanisms to train machine learning model(s) for one or more machine learning task(s) in a particular manner that better accounts for missing portions of data of one or more data types. For example, in some embodiments, interconnected variational autoencoder models, such as two or more variational/auto/encoders sharing one or more decoder(s), where certain encoders and decoders are utilized during training based on the types of data available in different portions of the training data set. Such different training mechanism(s) may be repeated for each portion of training data in the training data set. In this regard, for example, such embodiments enable the model(s) to be trained in a manner that better learns despite any portion of missing data in the training data set. Additionally, embodiments of the present disclosure are trained to generate imputed code data in a manner that reflects a more accurate set of code data, or other types of data, thereof. Additionally or alternatively, some embodiments are specially configured to generate synthetic data that accurately reflects learnings of training data, such that the synthetic data that accurately represents the data values of the training data set without exposing such actual data associated with one or more entities, for example, actual data associated with a patient.

IV. Examples of Certain Terms

"Variational autoencoder model" refers to a machine learning model including an encoder and a decoder, where the machine learning model is specially trained to learn an efficient encoded representation of input data via the encoder and decoder.

"Claims data" refers to electronically managed data representing detailed information associated with medical claim(s) derived associated with at least one healthcare event. Non-limiting examples of claims data includes one or more record(s) that each include code data, visit data, and/or financial data.

"Claims encoder" refers to a machine learning model specifically configured to generate an encoded representation of inputted claims data.

"Clinical data" refers to electronically managed data representing detailed data associated with a patient that is derived associated with at least one healthcare event. Non-limiting examples of clinical data includes code data, visit data, and/or patient data.

"Clinical encoder" refers to a machine learning model specifically configured to generate an encoded representation of inputted clinical data.

"Code data" refers to electronically managed data representing one or more medical code(s).

"Code decoder" refers to a machine learning model specially configured to generate reconstructed code data based on an embedded representation of data inputted to the model. Non-limiting examples of data inputted to a code decoder includes a sampled portion of code embedding data.

"Code embedding data" refers to electronically managed data embodying an embedded representation associated with code data in particular inputted data within an embedding space, where the data embodying the embedded representation is generated and/or updated by a clinical encoder, a claims encoder, or any combination of the clinical encoder and the claims encoder.

"Embedding distance" refers to electronically managed data representing a difference between a first embedded representation and a second embedded representation in one or more embedding space(s).

"Financial data" refers to electronically managed data embodying amounts billed associated with particular code(s) represented by code data.

"Healthcare event" refers to any encounter, occurrence, or performance of healthcare-related services associated with a particular patient.

"Imputed code data" refers to code data predicted or otherwise inferred by one or more machine learning model(s) based on data inputted to the machine learning model(s).

"Interconnected" refers to two or more model(s) that are each configured to update the same embedding space.

"Interconnected variational autoencoder models" refers to any two or more variational autoencoder models that are interconnected to update one or more embedding spaces shared between the two or more variational autoencoder models.

"Non-code data" refers to electronically managed data representing data value(s) other than code data in a particular portion of data. Non-limiting examples of non-code data include patient data, including biographical data, demographic data, age data, and/or non-event medical diagnosis data, and visit data.

"Non-code decoder" refers to a machine learning model specially trained to generate non-code portions of clinical data and/or non-code portions of data from inputted data embodying an embedded representation of an embedding space. Non-limiting examples of data inputted to a non-code decoder includes a sampled portion of non-code embedding data and/or code embedding data.

"Non-code embedding data" refers to electronically managed data representing non-code portions of clinical data and/or code data in a particular embedding space.

"Output data" refers to electronically managed data generated by a machine learning model in response to a particular modeling task for which the machine learning model is trained.

"Patient data" refers to electronically managed data representing detail information associated with a patient that experienced a healthcare event, where such detail information is not specific to any particular healthcare event. Non-limiting examples of patient data includes patient biographical data, patient demographic information, diagnosis onset date data, diagnosis duration data, diagnosis severity data, and/or treatment side effect data.

"Processable clinical data" refers to electronically managed data that is processed by a trained machine learning model.

"Sampled distribution" refers to electronically managed data representing or defining particular data points, values, or other samples to be selected from one or more data distribution(s).

"Set" refers to one or more data structures embodying any number of data objects of a particular data type. The terms "set of [data objects]" and "[data object] sets" each refer to a set of a particular type of data object.

"Synthetic code data" refers to code data generated by at least one machine learning model based on input data.

"Training data set" refers to electronically managed data utilized to train one or more machine learning models.

"Visit data" refers to electronically managed data representing metadata associated with a healthcare event. Non-limiting examples of visit data include a date of a healthcare event and a location of a healthcare event.

V. Example System Operations

Having described example technical challenges and solutions at a high level, example data flows and data architectures of the disclosure will now be discussed. It will be appreciated that in some embodiments the data flows and data architectures are maintained via one or more software environment(s) executed on particular hardware of computing device(s). For example, in some embodiments the predictive computing entity 102 maintains at least one software environment executed on the hardware of the predictive computing entity 102.

Figure 3:
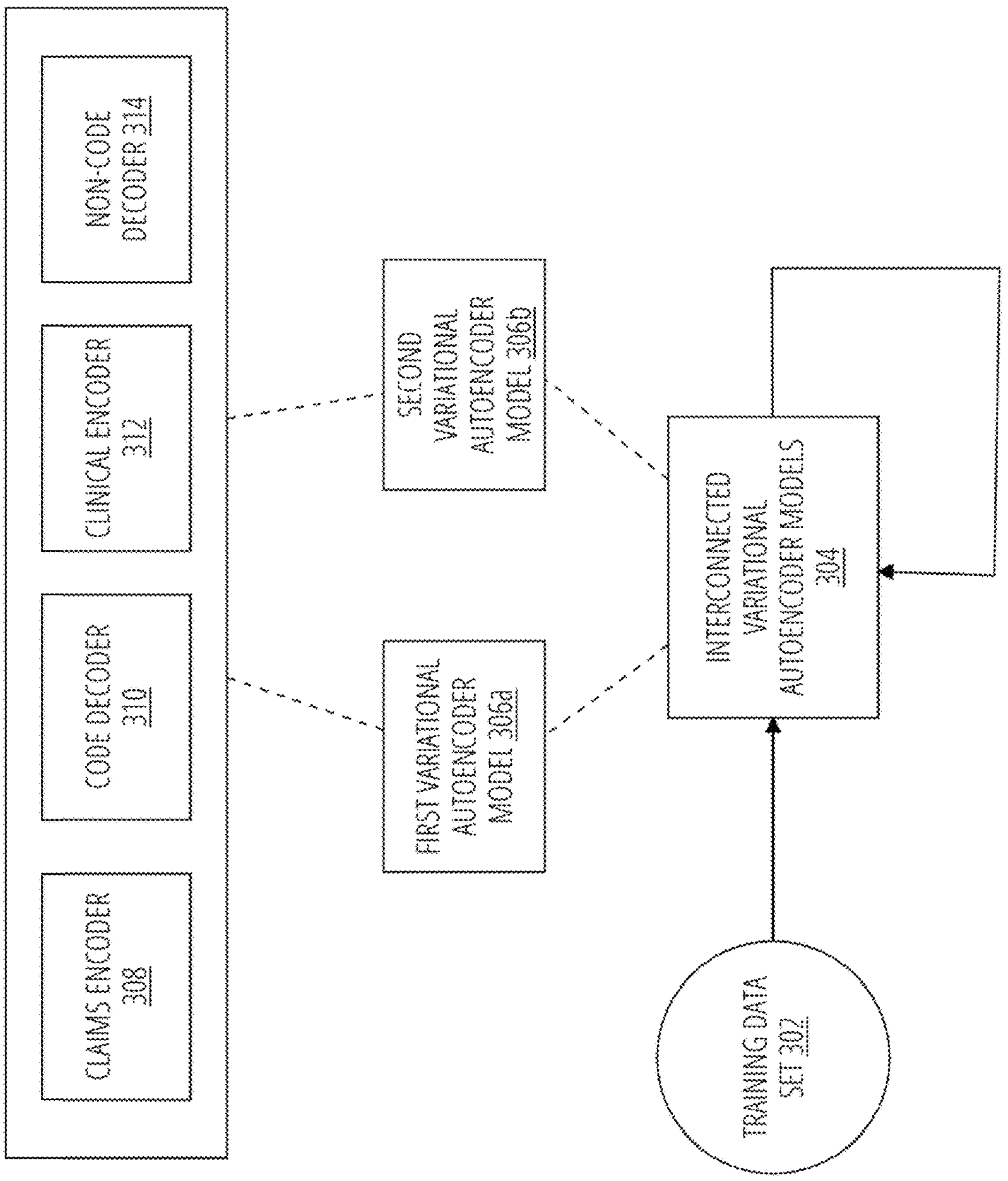
FIG. 3 illustrates an example data flow in accordance with at least one embodiment of the present disclosure.

FIG. 3 illustrates an example data flow in accordance with at least one embodiment of the present disclosure. Specifically, FIG. 3 illustrates a data flow for training interconnected variational autoencoder models 304 in accordance with the present disclosure. In this regard, in some embodiments the interconnected variational autoencoder models 304 is trained to enable use of one or more sub-models of the interconnected variational autoencoder models 304. For example, in some embodiments, the interconnected variational autoencoder models 304 includes a plurality of variational/auto/encoder models, such as the first variational/auto/encoder model 306*a* and second variational/auto/encoder model 306*b*. The plurality of variational autoencoder models further define a plurality of individual sub-models embodying encoders and decoders. As illustrated, for example, the first variational/auto/encoder model 306*a* and second variational/auto/encoder model 306*b* define a claims encoder 308, a code decoder 310, a clinical encoder 312, and a non-code decoder 314. In this regard, each of these sub-models may be updated during training of the interconnected variational autoencoder models 304.

In some embodiments, the training data set 302 includes one or more types of data. For example, in some embodiments, the training data set 302 includes claims data, clinical data, or a combination of both claims data and clinical data. In some embodiments, each portion of data embodies one or more different record(s) of claims data or clinical data. In some embodiments, the training data set 302 includes a set embodying one or more portions of clinical data, a set embodying one or more portions of claims data, or any combination of both sets of clinical data and claims data. In some embodiments, the interconnected variational autoencoder models 304 is trained utilizing different training mechanism(s) and/or techniques in different scenarios based on the data of the training data set 302. For example, in some embodiments, the interconnected variational autoencoder models 304 is trained differently based on whether the training data set 302 is determined to have only a set of claims data and not a set of clinical data, only a set of clinical data and not a set of claims data, or a combination of a set of clinical data and a set of claims data. Specifics of each of these training scenarios is depicted and described further herein with respect to FIG. 6A-FIG. 6C.

In some embodiments, the training data set 302 is processed by the interconnected variational autoencoder models 304 to train the various sub-models 308-314. In this regard, the sub-models 308-314 are updated based on learned data pattern(s), trend(s), and/or the like identified within the interconnected variational autoencoder models 304. For example, in some embodiments the interconnected variational autoencoder models 304 is trained such that the claims encoder 308 and clinical encoder 312 learn to maintain accurate particular embedding spaces representing code data and non-code data from the training data set, respectively, and the code decoder 310 and non-code decoder 314 learn to reconstruct or otherwise generate imputed code data and imputed non-code data from embedded representations within the code and non-code embedding spaces, respectively.

Figure 4:
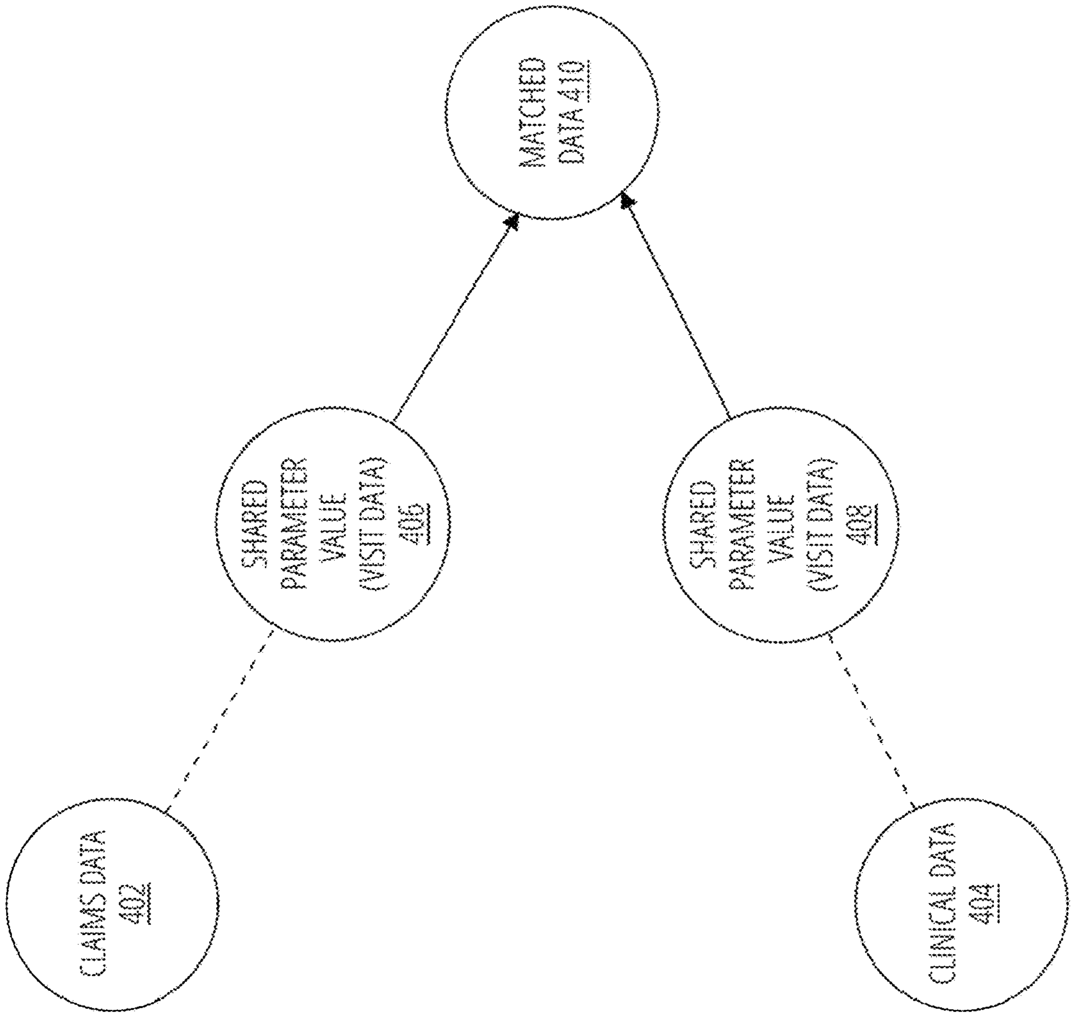
FIG. 4 illustrates an example data architecture in accordance with at least one embodiment of the present disclosure.

FIG. 4 illustrates an example data architecture in accordance with at least one embodiment of the present disclosure. Specifically, FIG. 4 depicts an example data architecture for matching particular portions of data. As illustrated, the data architecture matches claims data 402 and clinical data 404, for example, where claims data 402 and clinical data 404 embody portions of a training data set.

In some embodiments, two or more portions of data are linked based on particular value(s) shared for a particular parameter represented in the two or more portions of data. As illustrated for example, the clinical data 404 in some embodiments includes shared parameter value 408 and the claims data 402 includes shared parameter value 406. In some embodiments, the shared parameter value 406 and shared parameter value 408 each embody visit data corresponding to the claims data 402 and clinical data 404 respectively. In this regard, the shared parameter value 406 and shared parameter value 408 include data values that indicate the same location, time, and/or other data indicating that such portions of data are associated with the same healthcare event. It should be appreciated that, in other embodiments, the shared parameter value 406 and shared parameter value 408 corresponds to other data parameter(s) that may be shared between claims data 402 and clinical data 404.

Some embodiments, for example, embodied by the predictive computing entity 102 configured as described herein, process one or more portions of data to attempt to link such data. For example, some embodiments process each portion of data in a training data set, or otherwise identified for training, to determine if the portion of data matches any other portion of data in the training data set or otherwise identified for training. In some embodiments, the portions of data from a set of clinical data are compared with portions of data from a set of claims data for matching.

In some embodiments, the matched data 410 is generated based on the matched portions of data. For example, in this regard, the claims data 402 and clinical data 404 may be linked to generate the matched data 410. In this regard, the matched data 410 may be processed as a combined data record. In some embodiments, code data from claims data 402 and code data from clinical data 404 is linked together such that the portions of code data are processable together. Additionally or alternatively, in some embodiments, the matched data 410 is utilized as a source of truth, where the code data from the claims data 402 may be linked to the code data and corresponding non-code data of the clinical data 404. Additionally or alternatively still, in some embodiments, particular data may be masked or otherwise temporarily removed from the matched data 410 during training.

Figure 5:
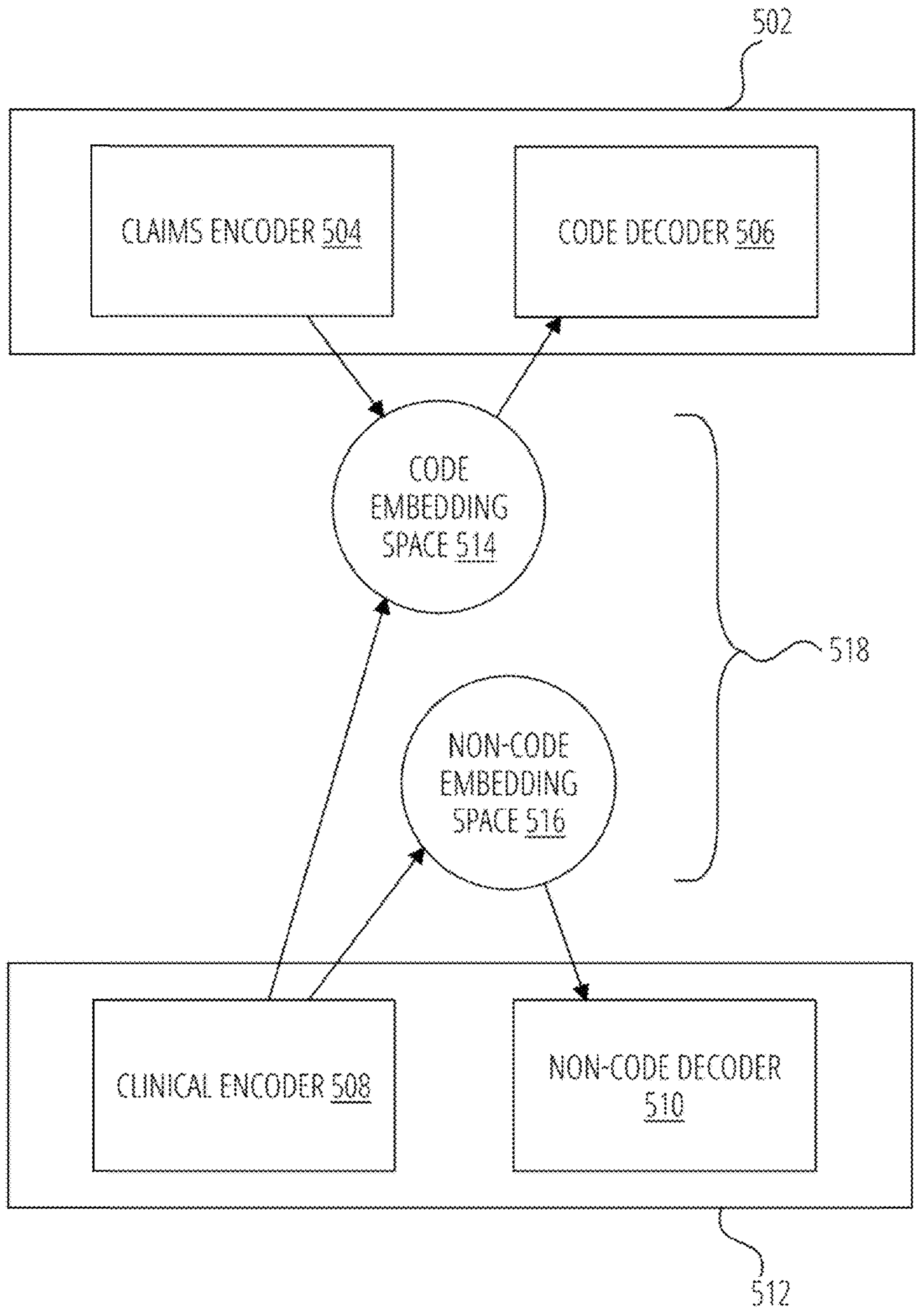
FIG. 5 illustrates an example visualization of a data architecture of embedding spaces updated via interconnected variational autoencoder models in accordance with at least one embodiment of the present disclosure.

FIG. 5 illustrates an example visualization of a data architecture of embedding spaces updated via interconnected variational autoencoder models in accordance with at least one embodiment of the present disclosure. Specifically, FIG. 5 depicts representations of embedding spaces maintained via sub-models of interconnected variational autoencoder models. FIG. 5 depicts the first variational/auto/encoder model 502 and second variational/auto/encoder model 512, including claims encoder 504, code decoder 506, clinical encoder 508, and non-code decoder 510 respectively. The two variational/auto/encoder models embodied by the first variational/auto/encoder model 502 and second variational/auto/encoder model 512 are depicted as separate for ease of visualization. However, it should be appreciated that the components of the two variational/auto/encoders, for example, their sub-model encoders and decoders thereof, are configured to interact between one another such that no decoder is exclusively paired with only one of the encoders. Rather, each variational/auto/encoder model is interconnected such that each decoder may be associated with each encoders of the plurality of encoders embodying sub-models of the interconnected variational autoencoder models. Further, it will be appreciated that the interconnected variational autoencoder models in some embodiments are trained as depicted and described with respect to FIG. 3 and FIG. 4.

As illustrated, the data architecture includes a code embedding space 514 and non-code embedding space 516. In some embodiments, the code embedding space 514 is embodied by code embedding data maintained by one or more device(s), for example, predictive computing entity 102. Similarly, in some embodiments the non-code embedding space 516 is embodied by non-code embedding data maintained by the one or more device(s), for example, predictive computing entity 102. In this regard, the code embedding space 514 may represent an embedding space representing projections of embedded representations of code data at a lower dimensionality than the code data itself. Similarly, the non-code embedding space 516 may represent an embedding space representing projections of embedded representations of non-code data at a lower dimensionality than the non-code data itself. In some embodiments, the code embedding space 514 and/or the non-code embedding space 516 embodies a two dimensional space within which embedded representations of code data, or non-code data respectively, are projected.

In some embodiments, the particular embedding spaces are updated by one or more sub-models of the interconnected variational autoencoder models 502 and 512. For example, as illustrated, claims encoder 504 updates at least the code embedding space 514. In this regard, the claims encoder 504 may update the code embedding space 514 during training. Similarly, the clinical encoder 508 updates at least the code embedding space 514. Accordingly, the claims encoder 504 and clinical encoder 508 share the code embedding space 514, with each updating the code embedding space 514 based on learnings from the code data processed by each of the clinical encoder 508 and claims encoder 504. For example, in some embodiments, the claims encoder 504 learns from code data in claims data processed by the claims encoder 504 during training, and clinical encoder 508 learns from code data in clinical data processed by the clinical encoder 508 during training. In some embodiments, the clinical encoder 508 updates the code embedding space 514 based on learnings from code data and non-code data of clinical data processed by the clinical encoder 508.

In some embodiments, the code embedding space 514 is shared between the multiple models that update the shared code embedding space 514. The code embedding space 514 is processable by the code decoder 506. For example, in some embodiments, a distribution is utilized to sample from the code embedding space 514. The sampled distribution of the code embedding space 514 is processable by the code decoder 506 to decode the embedded representations sampled from the code embedding space 514 based on the sampled distribution. In this regard, the code decoder 506 may reconstruct code data from the sampled distribution of the code embedding space 514, for example, embodying or including imputed code data.

In some embodiments, as illustrated, the non-code embedding space 516 is updated only by the clinical encoder 508. For example, in some embodiments, the clinical encoder 508 updates the non-code embedding space 516 during training. In this regard, the clinical encoder 508 updates the non-code embedding space 516 in some embodiments based on learnings from the non-code data, and/or combination of code data and non-code data, processed by the clinical encoder 508 from clinical data during training. Accordingly, the clinical encoder 508 may be solely responsible for updating the non-code embedding space 516.

In some embodiments, the non-code embedding space 516 is processable by the non-code decoder 510. For example, in some embodiments, a distribution is utilized to sample from the non-code embedding space 516. The sampled distribution of the non-code embedding space 516 is processable by the non-code decoder 510 to decode the embedded representations sampled from the non-code embedding space 516 based on the sampled distribution. In this regard, the non-code decoder 510 may reconstruct non-code data from the sampled distribution of the non-code embedding space 516, for example, embodying or including imputed non-code data.

In some embodiments, the embedding spaces updated via the models of the interconnected variational autoencoder models are maintained in parallel. For example, in some embodiments, similarities are desired between the code embedding space 514 and the non-code embedding space 516, such that code data is embedded similarly to non-code data that is learned to be paired based on the training data set as processed. In the context of medical claims and clinical data processing for example, non-code data representing patient non-code information is to be embedded similarly to corresponding code information that is expected or otherwise likely corresponding to that particular non-code information. In this regard, for example, code data representing particular diagnoses representing particular code data may be more prevalent with patients having non-code data representing an older age, such that embedded representations of such non-code data and code data may be mapped to a similar location in each of the code embedding space 514 and non-code embedding space 516 respectively.

Some embodiments apply an embedding distance-based penalty 518 to maintain such parity between the two embedding spaces, specifically non-code embedding space 516 and code embedding space 514. For example, in some embodiments, the embedding distance-based penalty 518 represents a particular value applied to the loss function of one or more, or each, of the encoders and/or decoders, based on the distance between the embedded representations of particular data projected to each of the code embedding space 514 and non-code embedding space 516. In some embodiments, an embedding distance is determined during training as each portion of a training data set is utilized to update the code embedding space 514 and non-code embedding space 516. Subsequently, the claims encoder 504, code decoder 506, clinical encoder 508, and non-code decoder 510 are each updated based on the embedding distance, for example, by applying an embedding distance-based penalty 518 determined based on the embedding distance to the loss function of each model.

Example training scenarios for training the interconnected variational autoencoder models will now be described. In some embodiments, a particular training scenario is initiated for each portion of training data in a training data set. For example, in some embodiments, in a circumstance where a portion of the training data set includes at least a portion of claims data only and not a portion of clinical data, embodiments of the present disclosure may process such a portion of data utilizing the first training scenario. In circumstances where a portion of the training data set includes both a portion of clinical data and includes a portion of claims data of the present disclosure may process such a portion of data utilizing the second training scenario. In circumstances where a portion of the training data set includes at least a portion of clinical data only and not a portion of claims data, embodiments of the present disclosure may process such a portion of data utilizing the second training scenario. In this regard, different training scenarios may be utilized for processing a training data set including a set of claims data only, a set of clinical data only, and both a set of claims data and a set of clinical data.

Figure 6A:
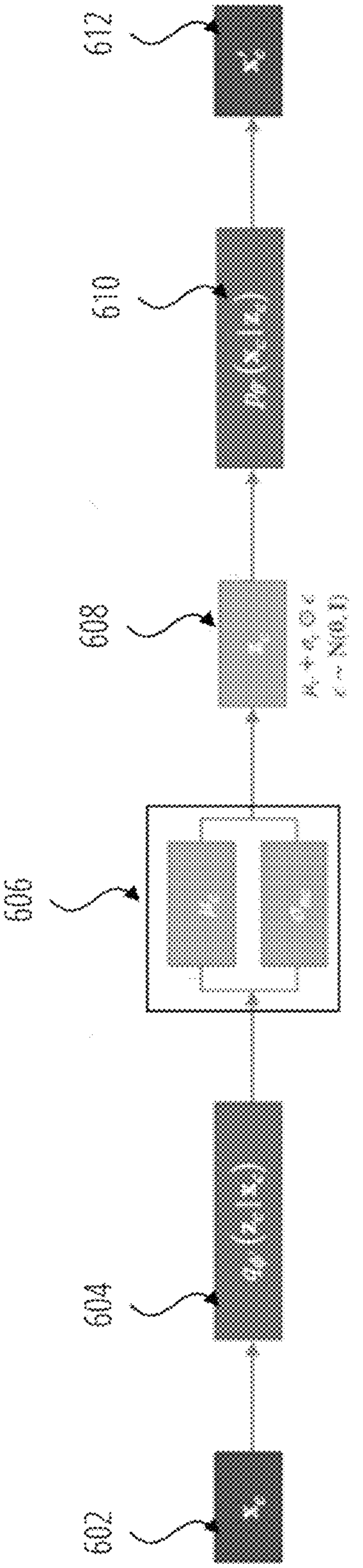
FIG. 6A illustrates an example visualization of a first training scenario in accordance with at least one embodiment of the present disclosure.

FIG. 6A illustrates an example visualization of a first training scenario in accordance with at least one embodiment of the present disclosure. In some embodiments, the first training scenario corresponds to a circumstance where embodiments determine that a portion of training data includes a set of claims data only (e.g., and not a set of clinical data). For example, as illustrated, the training data set is determined to include only the claims data 602. In some embodiments, the claims data 602 includes at least code data for processing associated with one or more healthcare event.

In the first training scenario, claims data 602 is applied to the claims encoder 604. The claims encoder 604 is configured to update a particular embedding space, for example, a code embedding space embodied by the code embedding data 606, based on the claims data 602. In some embodiments, the claims encoder 604 embodies an encoder segment of a variational/auto/encoder, such that it generates the code embedding data 606 embodying one or more distributions of data values representing the data values of the claims data 602, for example, code data represented therein. In this regard, the code embedding data 606 in some embodiments includes, or otherwise embodies, at least one distribution each comprising a measure of central tendency, for example, a mean value, and a measure of variation, for example, a standard deviation value. The claims encoder 604 may update such values during training based on inputted portions of the training data set, for example, the claims data 602.

In some embodiments, the code embedding data 606 represents a particular distribution or multiple distributions of embedded representations. In some embodiments, the distribution(s) represented by the code embedding data 606 is subsequently sampled for applying to a corresponding decoder segment of the variational/auto/encoder. For example, as illustrated, a sampled distribution 608 is identified or otherwise selected from the code embedding data 606. In some embodiments, the sampled distribution 608 is randomly generated, for example, by randomly generating a value along the distribution embodied by the code embedding data 606 from which to select a sample for one or more samples of embedded data representations embodied in the code embedding data 606.

In some embodiments, the sampled distribution 608 is applied to the code decoder 610. In this regard, the code decoder 610 is configured to generate particular data based on the input data applied to the code decoder 610. For example, in some embodiments, the code decoder 610 is configured to decode embedded representations of code data represented as samples in the sampled distribution 608. In this regard, the code decoder 610 generates reconstructed code data 612 representing the particular code data that is predicted to correspond to a particular embedded representation from the sampled distribution 608. In this regard, the code decoder 610 may learn accurate data trend(s), pattern(s), and/or the like based on whether the reconstructed code data 612 includes the same codes represented in claims data 602.

Figure 6B:
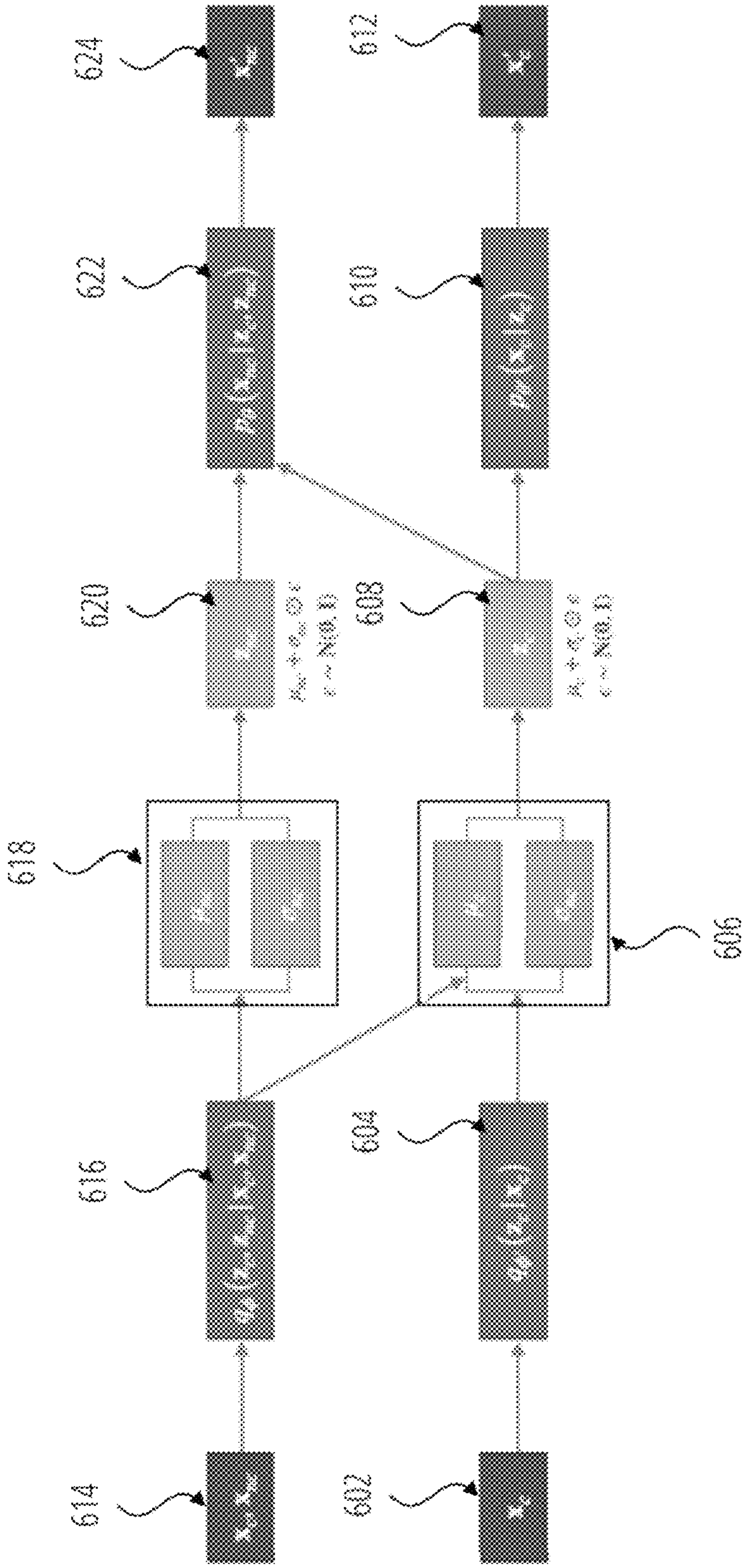
FIG. 6B illustrates an example visualization of a second training scenario in accordance with at least one embodiment of the present disclosure.

FIG. 6B illustrates an example visualization of a second training scenario in accordance with at least one embodiment of the present disclosure. Specifically, in some embodiments, the first training scenario corresponds to a circumstance where embodiments determine that a portion of training data includes both a set of claims data and a set of clinical data. For example, as illustrated, the training data set is determined to include the claims data 602 and clinical data 614. The claims data 602 may include code data as depicted and described with respect to FIG. 6A. In some embodiments, the clinical data 614 includes code data and/or non-code data associated with one or more healthcare event. In some embodiments, the claims data 602 and clinical data 614 correspond to the same healthcare event. For example, in some embodiments, the claims data 602 and clinical data 614 embody matched data determined dynamically, or during a preprocessing step, that links the claims data 602 and clinical data 614 as associated with the same healthcare event.

In the second training scenario, the claims data 602 is applied to the claims encoder 604, which generates or otherwise updates the code embedding data 606. The code embedding data 606 is then sampled to determine sampled distribution 608. The sampled distribution 608 is then applied to or otherwise processed by the code decoder 610 to generate reconstructed code data 612. In this regard, the claims data 602 may be processed in the same manner as depicted and described with respect to the first training scenario in FIG. 6A.

In some embodiments, in the second training scenario, the clinical data 614 is applied to the clinical encoder 616. The clinical encoder 616 is configured to update a particular embedding space, for example, a non-code embedding space embodied by the non-code embedding data 618, based on the clinical data 614. In some embodiments, the clinical encoder 616 embodies an encoder segment of another variational/auto/encoder, such that it generates or otherwise updates the non-code embedding data 618 embodying one or more distributions of data values representing the data values of the clinical data 614, for example, non-code data represented therein. In this regard, the non-code embedding data 618 in some embodiments includes or otherwise embodies at least one distribution, each comprising a measure of central tendency, for example, a mean value, and a measure of variation, for example, a standard deviation value. The clinical encoder 616 may update such values during training based on inputted portions of the training data set, for example, the clinical encoder 616.

In some embodiments, in the second training scenario, the clinical encoder 616 updates the code embedding data 606. For example, in some embodiments, the clinical encoder 616 is configured to generate and/or otherwise update the code embedding data 606 based on the clinical data 614. In some embodiments, the clinical encoder 616 updates the code embedding data 606 based on the data values represented in the code data of the clinical data 614. In this regard, it will be appreciated that the code embedding data 606 is shared between the clinical encoder 616 and the claims encoder 604, such that each updates the same embedding space represented by the code embedding data 606 based on learnings from clinical data and claims data respectively.

In some embodiments, non-code embedding data 618 represents a particular distribution or multiple distributions of embedded representations. In some embodiments, the distribution(s) represented by the non-code embedding data 618 is subsequently sampled for applying to a corresponding decoder segment of the variational/auto/encoder. For example, as illustrated, a sampled distribution 620 is identified or otherwise selected from the non-code embedding data 618. In some embodiments, the sampled distribution 620 is randomly generated, for example, by randomly generating a value along the distribution embodied by the non-code embedding data 618 from which to select a sample for one or more samples of embedded representations embodied in the non-code embedding data 618.

In some embodiments, the sampled distribution 620 is applied to the non-code decoder 622 together with the sampled distribution 608. In this regard, the non-code decoder 622 is configured to generate particular data based on the input data applied to the non-code decoder 622. For example, in some embodiments, the non-code decoder 622 is configured to decode embedded representations of inputted data (e.g., non-code and code representations) represented as samples in the sampled distribution 620 and sampled distribution 608. In this regard, the non-code decoder 622 generates reconstructed non-code data 624 representing particular non-code data that is predicted to correspond to the particular embedded representations from the sampled distribution 608 and sampled distribution 620. The non-code decoder 622 thus may be trained to determine what non-code data corresponds to particular embedded representations of code data, for example, based on embedded representations of the code data and non-code data during training. In this regard, the non-code decoder 622 may learn accurate data trend(s), pattern(s), and/or the like based on whether the reconstructed non-code data 624 includes the same non-code data represented in the clinical data 614.

Figure 6C:
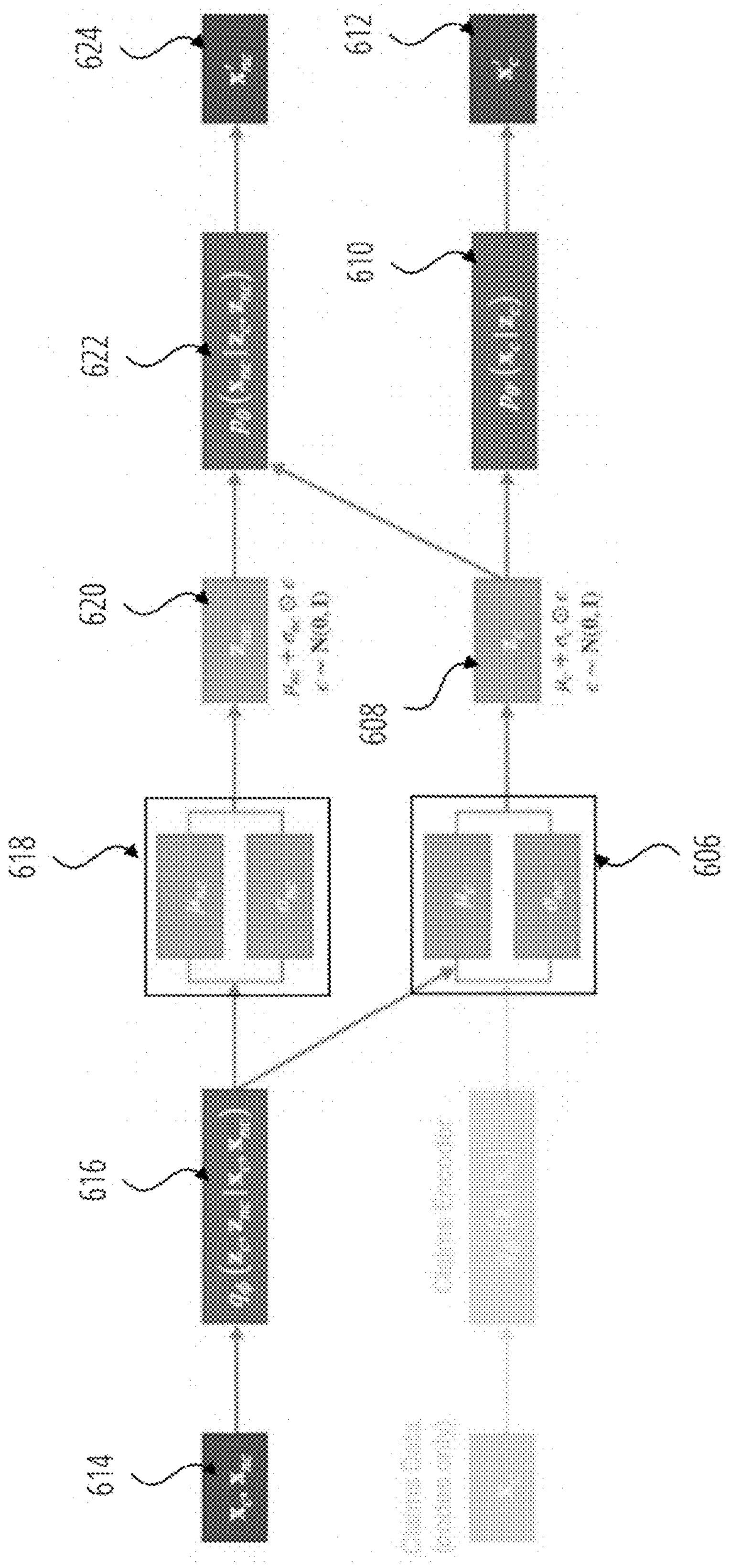
FIG. 6C illustrates an example visualization of a third training scenario in accordance with at least one embodiment of the present disclosure.

FIG. 6C illustrates an example visualization of a third training scenario in accordance with at least one embodiment of the present disclosure. Specifically, in some embodiments, the first training scenario corresponds to a circumstance where embodiments determine that a portion of training data includes a set of clinical data only (e.g., and not a set of claims data). For example, as illustrated, the training data set is determined to include only the clinical data 614. In some embodiments, the clinical data 614 includes at least code data and non-code data for processing associated with one or more healthcare events.

In the third training scenario, clinical data 614 is applied to the clinical encoder 616. The clinical encoder 616 is configured to update the non-code embedding data 618 and code embedding data 606. The code embedding data 606 is then sampled to determine a sampled distribution 608, and similarly the non-code embedding data 618 is sampled to determine the sampled distribution 620. The sampled distribution 608 is then applied to or otherwise processed by the code decoder 610 to generate reconstructed code data 612, and similarly the sampled distribution 620 and sampled distribution 608 are applied to or otherwise processed by the non-code decoder 622 to generate reconstructed non-code data 624. In this regard, the clinical data 614 may be processed in the manner as depicted and described with respect to FIG. 6B to generate the reconstructed non-code data 624 and reconstructed code data 612.

Unlike the second training scenario, in the third training scenario there is no use of the claims encoder. In this regard, in the third training scenario the clinical data 614 is utilized to update both the non-code embedding data 618 and the code embedding data 606, which is shared with the claims encoder, based on the data insights derived solely from the clinical data 614. It should be appreciated that such data insights may be carried forward to future learning during use of the first or second training scenario in association with processing other portions of a training data set. In this regard, some embodiments repeat the first training scenario, second training scenario, and/or third training scenario for each portion of a training data set until each portion of the training data set is processed.

Figure 7:
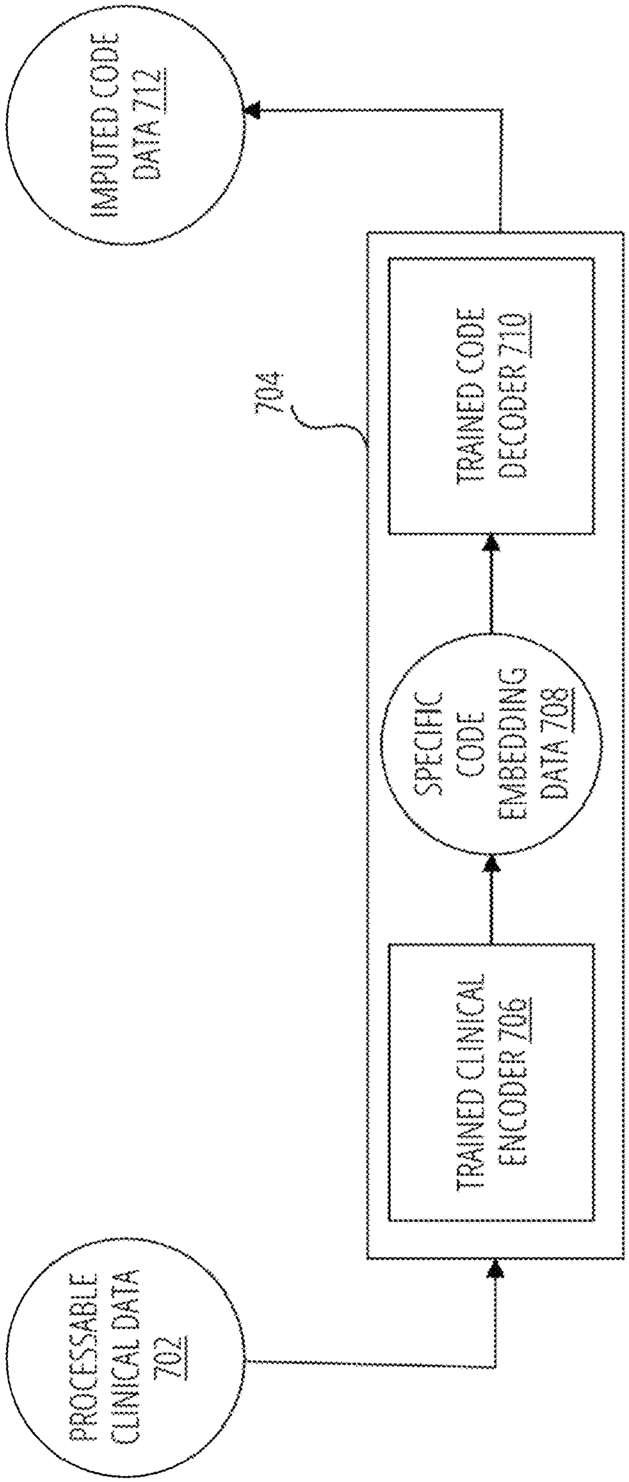
FIG. 7 illustrates an example data flow for generating imputed code data in accordance with at least one embodiment of the present disclosure.

FIG. 7 illustrates an example data flow for generating imputed code data in accordance with at least one embodiment of the present disclosure. Specifically, FIG. 7 depicts generation of imputed code data 712 utilizing a trained variational/auto/encoder model 704. In some embodiments, the trained variational/auto/encoder model 704 is embodied by or includes one or more particular encoder(s) and decoder (s) trained as described herein. For example, as illustrated, the trained variational/auto/encoder model 704 includes or otherwise is embodied by the trained clinical encoder 706 and the trained code decoder 710. In some embodiments, the trained clinical encoder 706 embodies the clinical encoder 616 upon completion of a training process based on a training data set utilizing any combination of training scenarios one, two, and/or three as depicted and described with respect to FIGS. 6A, 6B, and 6C. Similarly, in some embodiments the trained code decoder 710 includes or otherwise is embodied by the code decoder 610 upon completion of a training process based on a training data set utilizing any combination of training scenarios one, two, and/or three as depicted and described with respect to FIGS. 6A, 6B, and 6C.

As illustrated, the processable clinical data 702 is applied to the trained variational/auto/encoder model 704. Specifically, the processable clinical data 702 is applied to the trained clinical encoder 706. In some embodiments, the processable clinical data 702 includes or is embodied by a subsequently captured, received, or received portion of clinical data that is determined or otherwise indicated as missing or possibly missing one or more portions of code data. The processable clinical data 702 may be missing code data for any of a myriad of reasons, for example, due to incomplete record submissions by providers associated with one or more particular healthcare event(s). In some embodiments, all portions of subsequently captured, received, or retrieved clinical data for processing is considered possibly missing one or more portions of code data.

In some embodiments, the processable clinical data 702 is specifically input to the trained clinical encoder 706. The trained clinical encoder 706 encodes the processable clinical data 702 to generate a corresponding embedded representation. Specifically, the trained clinical encoder 706 generates specific code embedding data 708. In some embodiments, the specific code embedding data 708 represents a specific embedded representation of the processable clinical data 702, for example, corresponding to a particular point along a distribution embodying a code embedding space.

In some embodiments, the specific code embedding data 708 is applied to the trained code decoder 710. In this regard, the trained code decoder 710 decodes the specific code embedding data 708 to produce corresponding output data that is outputted from the trained variational/auto/encoder model 704. Specifically, in some embodiments, the trained code decoder 710 generates and outputs reconstructed code data representing all codes expected or otherwise decoded that should be present based on the inputted processable clinical data 702. In this regard, the trained variational/auto/encoder model 704 or corresponding system may generate and/or output the imputed code data 712. In some embodiments, the imputed code data 712 includes the complete set of generated code data reconstructed from the specific code embedding data 708 via the trained code decoder 710. In other embodiments, the imputed code data 712 includes one or more particular portions of code data representing codes missing from the processable clinical data 702 based on a set of reconstructed code data generated from the trained code decoder 710. Upon generation, the imputed code data 712 may be outputted for further processing, to cause rendering of a corresponding interface for user access and/or review, and/or the like.

Figure 8:
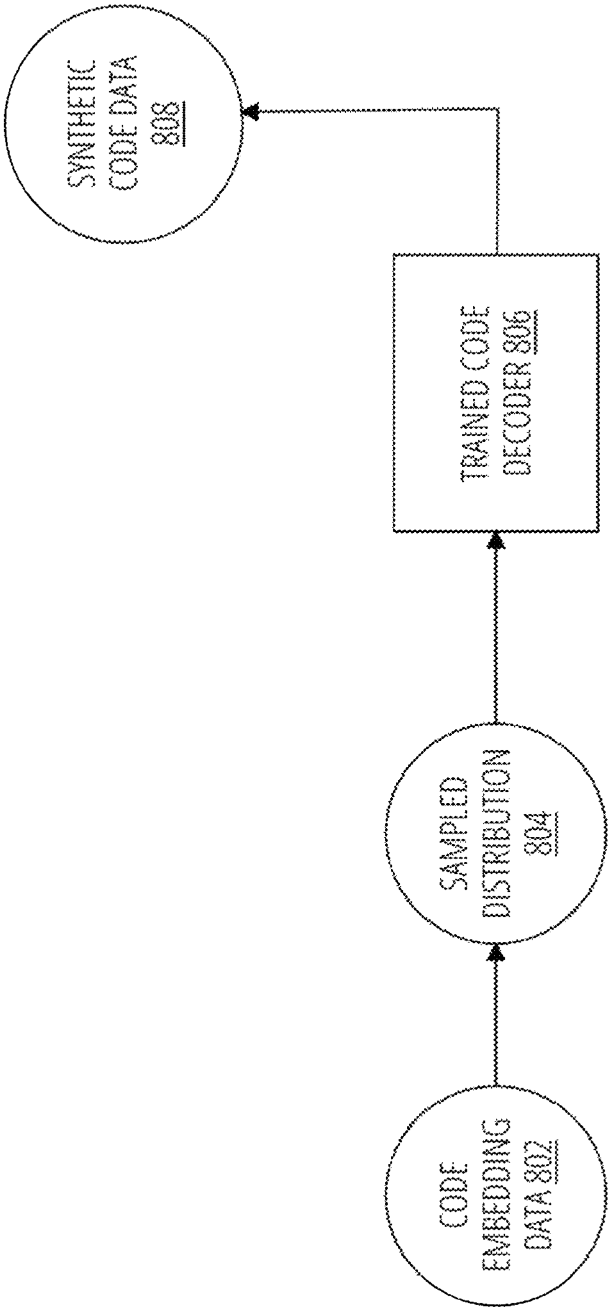
FIG. 8 illustrates an example data flow for generating synthetic code data in accordance with at least one embodiment of the present disclosure.

FIG. 8 illustrates an example data flow for generating synthetic code data in accordance with at least one embodiment of the present disclosure. Specifically, FIG. 8 depicts generation of synthetic code data 808 utilizing portions of a trained variational/auto/encoder model, for example, the trained code decoder 806. In some embodiments, the trained code decoder 806 embodies the code decoder 610 upon completion of a training process based on a training data set utilizing any combination of training scenarios one, two, and/or three as depicted and described with respect to FIGS. 6A, 6B, and 6C.

As illustrated, some embodiments select or otherwise generate a sampled distribution 804 from a particular embedding space, for example, embodied by code embedding data 802. In some embodiments, the code embedding data 802 embodies an embedding space updated based at least in part by a claims encoder 604 and/or a clinical encoder 616 during the training process. In this regard, the code embedding data 802 may embody at least one learned distribution of embedded of representations each embodied by at least a mean value and a standard deviation value.

The sampled distribution 804 in some embodiments represents particular sample embedded representations selected based on the at least one distribution represented by the code embedding data 802. In this regard, the sampled distribution 804 in some embodiments represents a selection of random samples from the code embedding data 802, for example, selected based on the mean value and standard deviation value of a particular distribution in combination with at least one random factor. It will be appreciated that in other embodiments, the sampled distribution 804 may be selected utilizing any of a myriad of desired selection algorithm(s).

In some embodiments, the sampled distribution 804 is applied to or other inputted to the trained code decoder 806. The trained code decoder 806 may generate code data based on the samples represented in the sampled distribution 804. For example, the trained code decoder 806 may decode the embedded representations of code data represented in the sampled distribution 804 to attempt to reconstruct each code in the code data represented by that embedded representation. In this regard, the trained code decoder 806 generates synthetic code data 808 embodying manufactured portions of code data corresponding to the embedded representations in the sampled distribution 804.

In some embodiments, the synthetic code data is advantageous for any of a myriad of use cases. For example, in some contexts the synthetic code data enables modeling of real data without risk of exposing actual data associated with actual individuals. In this regard, the synthetic code data is processable without privacy concerns with respect to any actual individual, for example, a patient. Furthermore, data sets including such synthetic code data are not merely processable to preserve patient privacy, but also enable accurate machine learning or other data processing techniques while simultaneously providing such data privacy advantages.

Having described example systems and apparatuses, data flows, data architectures, and training scenarios in accordance with the disclosure, example processes of the disclosure will now be discussed. It will be appreciated that each of the flowcharts depicts an example computer-implemented process that is performable by one or more of the apparatuses, systems, devices, and/or computer program products described herein, for example, utilizing one or more of the specially configured components thereof.

Although the example processes depict a particular sequence of operations, the sequence may be altered without departing from the scope of the present disclosure. For example, some of the operations depicted may be performed in parallel or in a different sequence that does not materially affect the function of the processes.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or dashed) lines. Similarly, it should be appreciated that one or more of the operations of each flowchart may be combinable, replaceable, and/or otherwise altered as described herein.

Figure 9:
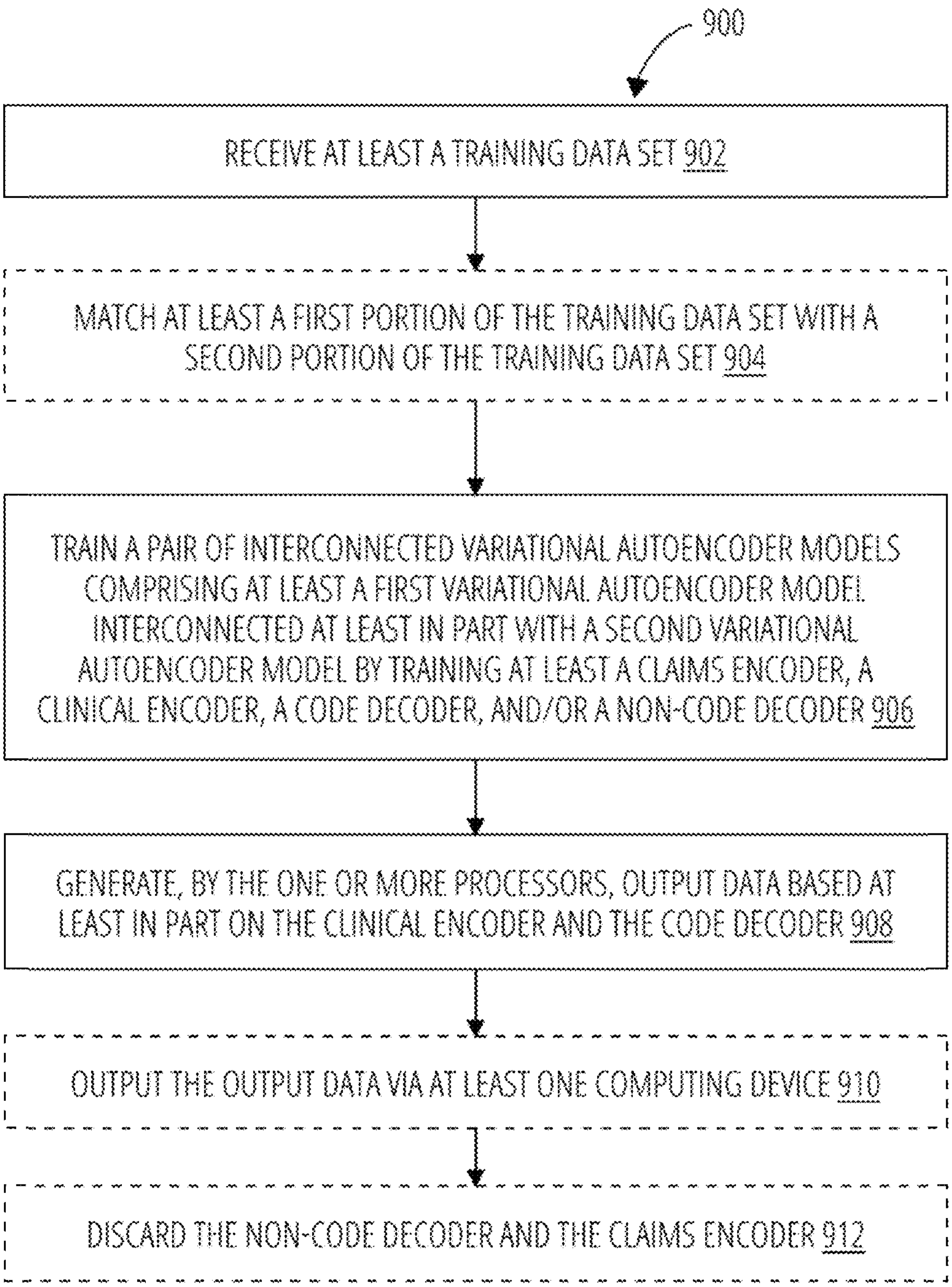
FIG. 9 illustrates a flowchart depicting example operations of an improved process in accordance with at least one embodiment of the present disclosure.

FIG. 9 illustrates a flowchart depicting example operations of an improved process in accordance with at least one embodiment of the present disclosure. Specifically, FIG. 9 depicts an example process 900. The process 900 embodies an example computer-implemented method. In some embodiments, the process 900 is embodied by computer program code stored on a non-transitory computer-readable storage medium of a computer program product configured for execution to perform the process as depicted and described. Alternatively or additionally, in some embodiments, the process 900 is performed by one or more specially configured computing devices, such as the predictive computing entity 102 alone or in communication with one or more other component(s), device(s), system(s), and/or the like. In this regard, in some such embodiments, the predictive computing entity 102 is specially configured by computer-coded instructions (e.g., computer program instructions) stored thereon, for example, in the memory element 106 and/or another component depicted and/or described herein and/or otherwise accessible to the predictive computing entity 102, for performing the operations as depicted and described. In some embodiments, the predictive computing entity 102 is in communication with one or more external apparatus(es), system(s), device(s), and/or the like, to perform one or more of the operations as depicted and described. In some embodiments, the predictive computing entity 102 is in communication with separate component(s) of a network, external network(s), and/or the like, to perform one or more of the operation(s) as depicted and described. For purposes of simplifying the description, the process 900 is described as performed by and from the perspective of the predictive computing entity 102.

Although the example process 900 depicts a particular sequence of operations, the sequence may be altered without departing from the scope of the present disclosure. For example, some of the operations depicted may be performed in parallel or in a different sequence that does not materially affect the function of the process 900. In other examples, different components of an example device or system that implements the process 900 may perform functions at substantially the same time or in a specific sequence.

According to some examples, the method includes receiving at least a training data set at operation 902. In some embodiments, the training data set is received from one or more other computing device(s). In some embodiments, the training data set is retrieved via one or more database(s), system(s), and/or the like accessible to the predictive computing entity 102. In some embodiments, the training data set includes a combination of data records embodying claims data only, clinical data only, or a combination of claims data and clinical data. It should be appreciated that different types of training data may be received, retrieved, or otherwise identified via different sources, for example, claims data may be received from a first data source and clinical data may be received from a second data source. Alternatively, in some embodiments, different data of the same data type is received from different data sources, for example, where a first portion of a set of claims data is received from a first data source and a second portion of the set of claims data is received from a second data source.

According to some examples, the method optionally includes matching at least a first portion of the training data set with a second portion of the training data set at optional operation 904. In some embodiments, for example, matching the first portion of the training data set with the second portion of the training data set links code data of the first portion with code data of the second portion to form a more complete portion of code data. For example, in some embodiments, two portions of the training data set that include matching visit data (e.g., datetime data indicating that the visits happened at the same date and/or time, and/or otherwise proximately to one another) may be matched and linked or otherwise combined. In some embodiments, portions of training data is combined based on one or more value(s) of particular parameter(s) of such portions of data. Additionally, it should be appreciated that different types of data may be combined, for example, a portion of claims data and a portion of clinical data. For example, in one example context, a first portion of the training data set embodying clinical data is matched with a corresponding second portion of the training data set embodying claims data based on matching a particular data parameter value between the two portions.

According to some examples, the method includes training a pair of interconnected variational autoencoder models at operation 906. The pair of interconnected variational autoencoder models is trained utilizing the received training data set. In some embodiments, the pair of interconnected variational autoencoder models includes at least a first variational autoencoder model interconnected at least in part with a second variational autoencoder model. In this regard, the interconnected variational autoencoder models may be interconnected by sharing at least one particular embedding space that are updated via each of the interconnected variational autoencoder models. Additionally or alternatively, in some embodiments multiple embedding spaces are updated via the interconnected variational autoencoder models, where the interconnected variational autoencoder models are interconnected by penalizing a determined difference between embedded representations in the different multiple embedding spaces, as described herein. In some embodiments, the interconnected variational autoencoder models are trained by training at least a claims encoder, a clinical encoder, a code decoder, and/or a non-code decoder.

Figure 10:
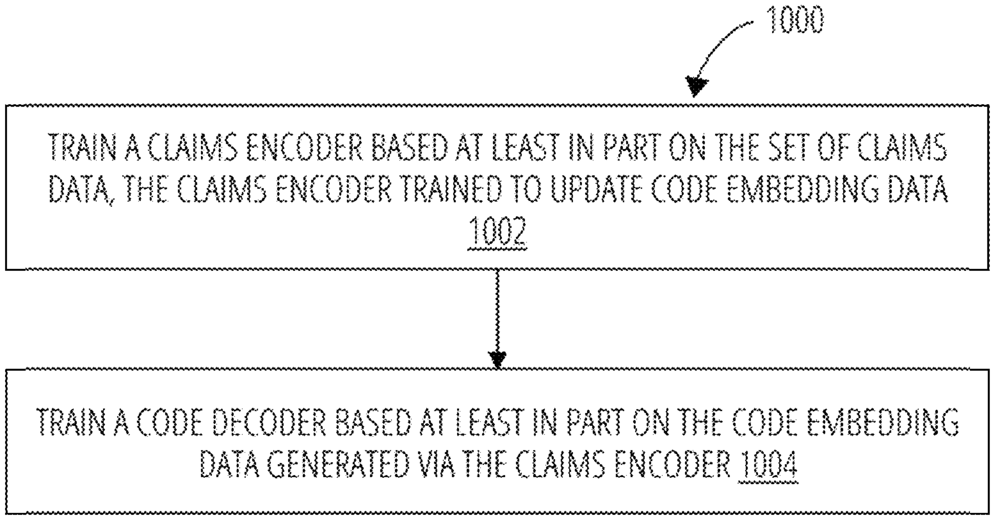
FIG. 10 illustrates a flowchart depicting example operations of a sub-process for training interconnected variational autoencoder models in a first training scenario in which a training data set includes a set of claims data and not a set of clinical data in accordance with at least one embodiment of the present disclosure
Figure 11:
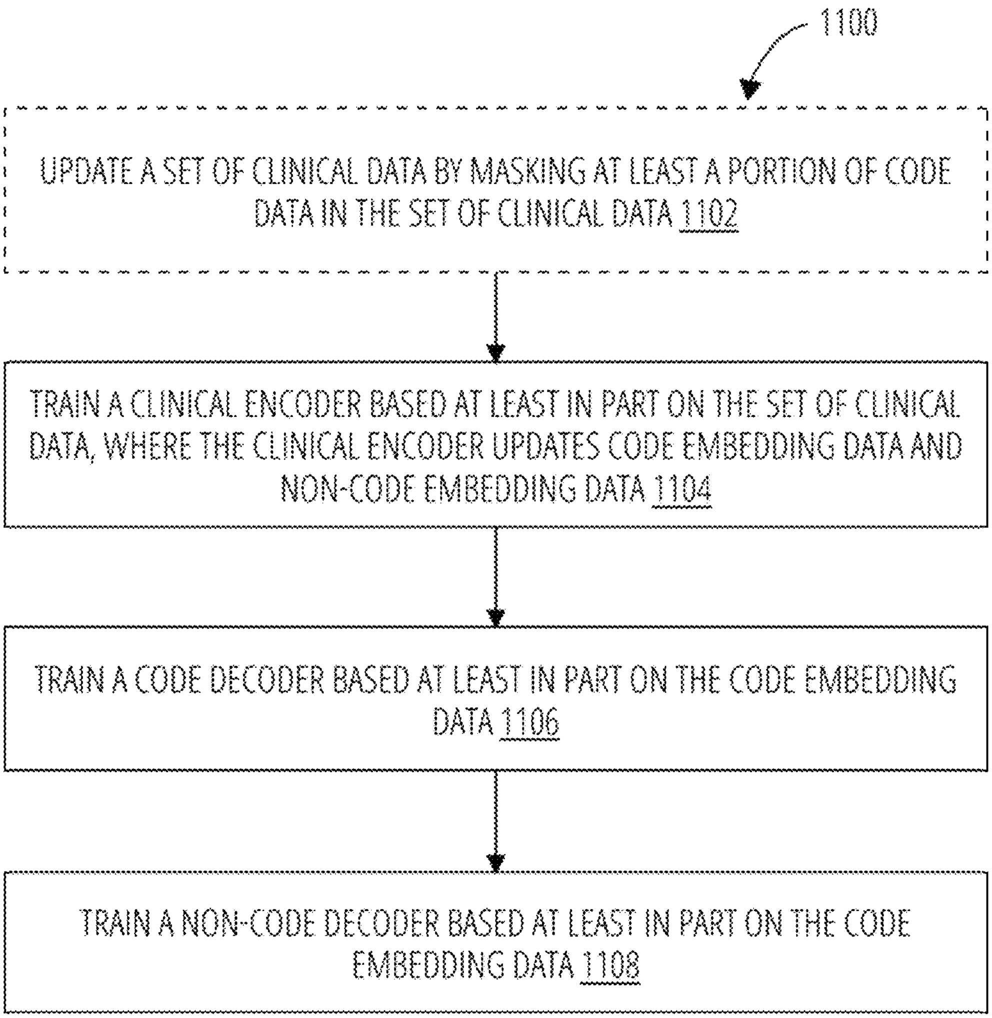
FIG. 11 illustrates a flowchart depicting example operations of a sub-process for training interconnected variational autoencoder models in a second training scenario in which a training data set includes a set of clinical data and not a set of claims data in accordance with at least one embodiment of the present disclosure.
Figure 12:
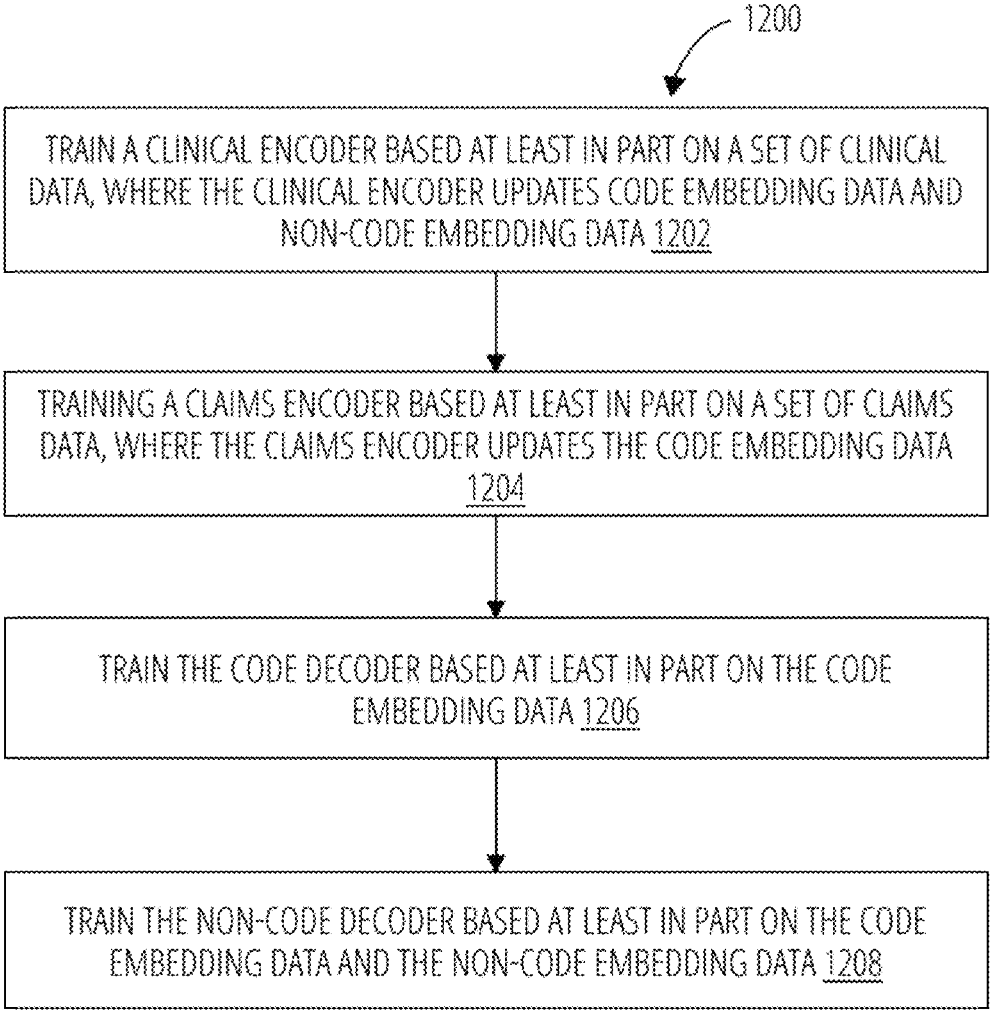
FIG. 12 illustrates a flowchart depicting example operations of a sub-process for training interconnected variational autoencoder models in a first training scenario in which a training data set includes a set of claims data and a set of clinical data in accordance with at least one embodiment of the present disclosure.

In some embodiments, the various encoders and decoders of the interconnected variational autoencoder models are trained utilizing particular training mechanism(s) as each portion of the training data set is utilized to train the pair of interconnected variational autoencoder models. In some such embodiments, the training mechanism(s) utilized to train the interconnected variational autoencoder models for a particular portion of the training data set depends on the types of data represented in the portion of training. For example, in some embodiments, a different training mechanism is utilized based on whether the training data set, or a particular portion thereof for example, includes only claims data, only clinical data, or a combination of both claims data and clinical data. In some embodiments, the training mechanism as described with respect to FIG. 10 is utilized in a circumstance where the training data set or particular portion thereof is determined to include only claims data, the training mechanism as described with respect to FIG. 11 is utilized in a circumstance where the training data set or particular portion thereof is determined to include only clinical data, and the training mechanism as described with respect to FIG. 12 is utilized in a circumstance where the training data set or particular portion thereof is determined to include a combination of claim data and clinical data. The training of the pair of interconnected variational autoencoder models may repeat for any number of portions of the training data set, for example, until all portions of the training data set have been processed. In this regard, in some embodiments, each training mechanism may be utilized during training of the interconnected variational autoencoder models, or a particular single variational autoencoder model, or in other embodiments only one or some of the training mechanisms are utilized during training of the interconnected variational autoencoder models, or a particular single variational autoencoder model.

According to some examples, the method includes generating, by the one or more processors, output data based on the clinical encoder and the code decoder at operation 908. In some embodiments, for example, the output data includes or embodies imputed code data generated based on subsequently received or otherwise identified processable clinical data. The processable clinical data may embody or include clinical data having or believed to have one or more missing portions of missing code data. In some such embodiments, the processable clinical data is applied to the trained clinical encoder of the interconnected variational autoencoder models to generate corresponding code embedding data specific to the processable clinical data. The specific code embedding data is then applied to the trained code decoder to generate the output data including or embodied by imputed code data, where the imputed code data includes or represents a full set of code data that may include any number of portions of code data predicted to be missing based on the corresponding inputted processable clinical data.

In some embodiments, the output data includes or embodies synthetic code data. In some embodiments, for example, the synthetic code data is generated based on a code embedding space updated based at least in part by the clinical encoder during training. For example, in some embodiments, a sampled distribution is determined from the code embedding data embodying the code embedding space, for example, by sampling the code embedding data based on an identified distribution of representative values. The distribution may be predetermined or determined by the embodiment to represent. In this regard, the sampled distribution may be representative of the likelihood of particular data value(s) being represented in the embedding space corresponding to the code embedding data.

According to some examples, the method includes outputting the output data via at least one computing device at optional operation 910. In some embodiments, the output data is outputted to a display of the predictive computing entity 102. In some embodiments, the output data is outputted via transmission to another computing device (e.g., a client device utilized to access functionality of the predictive computing entity 102) to cause rendering of the output data to a display of the other computing device. Additionally or alternatively, in some embodiments, the output data is outputted to another system for processing.

According to some examples, the method includes discarding the non-code decoder and the claims encoder at optional operation 912. In some embodiments, the non-code decoder and/or claims encoder are discarded from memory to offload computing resources associated with such models. Alternatively, in some embodiments, the non-code decoder and/or the claims encoder are stored for subsequent updating, training, and/or use.

FIG. 10 illustrates a flowchart depicting example operations of a sub-process for training interconnected variational autoencoder models in a first training scenario in which a training data set includes a set of claims data and not a set of clinical data in accordance with at least one embodiment of the present disclosure. The training scenario depicted and described with respect to FIG. 10 in some embodiments corresponds to a circumstance where the training data set is determined to include a set of claims data and determined to not include a set of clinical data. Specifically, FIG. 10 illustrates a process 1000. The process 1000 embodies an example computer-implemented method. In some embodiments, the process 1000 is embodied by computer program code stored on a non-transitory computer-readable storage medium of a computer program product configured for execution to perform the process as depicted and described. Alternatively or additionally, in some embodiments, the process 1000 is performed by one or more specially configured computing devices, such as the predictive computing entity 102 alone or in communication with one or more other component(s), device(s), system(s), and/or the like. In this regard, in some such embodiments, the predictive computing entity 102 is specially configured by computer-coded instructions (e.g., computer program instructions) stored thereon, for example, in the memory element 106 and/or another component depicted and/or described herein and/or otherwise accessible to the predictive computing entity 102, for performing the operations as depicted and described. In some embodiments, the predictive computing entity 102 is in communication with one or more external apparatus(es), system(s), device(s), and/or the like, to perform one or more of the operations as depicted and described. For example, the predictive computing entity 102 in some embodiments is in communication with a separate primary system, client system, and/or the like. For purposes of simplifying the description, the process 1000 is described as performed by and from the perspective of the predictive computing entity 102.

In some embodiments, the process 1000 begins at operation 1002. The process 1000 may begin after one or more operational blocks depicted and/or described with respect to any one of the other processes described herein. In this regard, some or all of the process 1000 may replace or supplement one or more operations depicted and/or described with respect to any of the processes described herein. For example, in some embodiments, the process 1000 begins after optional operation 904, and may replace, supplant, and/or otherwise supplement one or more operations of the process 900, such as at least a portion of the operation 906. Upon completion of the process 1000, the flow of operations may terminate. Additionally or alternatively, as depicted, upon completion of the process 1000 in some embodiments, flow may return to one or more operation(s) of another process, such as the operation 906. It will be appreciated that, in some embodiments, the process 1000 embodies a sub-process of one or more other process(es) depicted and/or described herein, for example, the process 900.

Although the example process 1000 depicts a particular sequence of operations, the sequence may be altered without departing from the scope of the present disclosure. For example, some of the operations depicted may be performed in parallel or in a different sequence that does not materially affect the function of the process 1000. In other examples, different components of an example device or system that implements the process 1000 may perform functions at substantially the same time or in a specific sequence.

In some embodiments, the method includes training a claims encoder based on the set of claims data at operation 1002. In some embodiments, the claims encoder is trained to update code embedding data. In some embodiments the code embedding data represents a particular code embedding space. The code embedding data in some embodiments is shared with one or more other model(s), for example, a clinical encoder, that similarly updates the code embedding data. In this regard, the code embedding data may be updated as the claims encoder learns during training.

In some embodiments, the method includes training a code decoder based on the code embedding data generated by the claims encoder at operation 1004. In some embodiments, the code decoder is trained by sampling from the code embedding data. The samples of the code embedding data may embody a sampled distribution representative of the embedding space embodied by the code embedding data. In some such embodiments, the code decoder is trained to generate reconstructed codes embodied by imputed code data based on the inputted sampled distribution, for example, where the sampled distribution of the code embedding data represents particular embedded representations sampled from the code embedding data.

FIG. 11 illustrates a flowchart depicting example operations of a sub-process for training interconnected variational autoencoder models in a second training scenario in which a training data set includes a set of clinical data and not a set of claims data in accordance with at least one embodiment of the present disclosure. The training scenario depicted and described with respect to FIG. 11 in some embodiments corresponds to a circumstance where the training data set is determined to include a set of clinical data and determined to not include a set of claims data. Specifically, FIG. 11 illustrates a process 1100. The process 1100 embodies an example computer-implemented method. In some embodiments, the process 1100 is embodied by computer program code stored on a non-transitory computer-readable storage medium of a computer program product configured for execution to perform the process as depicted and described. Alternatively or additionally, in some embodiments, the process 1100 is performed by one or more specially configured computing devices, such as the predictive computing entity 102 alone or in communication with one or more other component(s), device(s), system(s), and/or the like. In this regard, in some such embodiments, the predictive computing entity 102 is specially configured by computer-coded instructions (e.g., computer program instructions) stored thereon, for example, in the memory element 106 and/or another component depicted and/or described herein and/or otherwise accessible to the predictive computing entity 102, for performing the operations as depicted and described. In some embodiments, the predictive computing entity 102 is in communication with one or more external apparatus(es), system(s), device(s), and/or the like, to perform one or more of the operations as depicted and described. For example, the predictive computing entity 102 in some embodiments is in communication with a separate primary system, client system, and/or the like. For purposes of simplifying the description, the process 1100 is described as performed by and from the perspective of the predictive computing entity 102.

In some embodiments, the process 1100 begins at optional operation 1102. The process 1100 may begin after one or more operational blocks depicted and/or described with respect to any one of the other processes described herein. In this regard, some or all of the process 1100 may replace or supplement one or more operations depicted and/or described with respect to any of the processes described herein. For example, in some embodiments, the process 1100 begins after optional operation 904, and may replace, supplant, and/or otherwise supplement one or more operations of the process 900, such as at least a portion of the operation 906. Upon completion of the process 1100, the flow of operations may terminate. Additionally or alternatively, as depicted, upon completion of the process 1100 in some embodiments, flow may return to one or more operation(s) of another process, such as the operation 906. It will be appreciated that, in some embodiments, the process 1100 embodies a sub-process of one or more other process(es) depicted and/or described herein, for example, the process 900.

Although the example process 1100 depicts a particular sequence of operations, the sequence may be altered without departing from the scope of the present disclosure. For example, some of the operations depicted may be performed in parallel or in a different sequence that does not materially affect the function of the process 1100. In other examples, different components of an example device or system that implements the process 1100 may perform functions at substantially the same time or in a specific sequence.

In some embodiments, the method includes updating a set of clinical data by masking at least a portion of code data in the set of clinical data at optional operation 1102. In some embodiments, a determined mask is applied that removes the one or more portion(s) of code data from the set of clinical data. The mask may be applied to temporarily remove particular portions of code data during training of one or more model(s) as described herein. In this regard, the portions of code data that are masked may be utilized during training to generate imputed code data and determine whether the masked code data portions are represented in the imputed code data.

In some embodiments, the method includes training a clinical encoder based on the set of clinical data at operation 1104. In some embodiments, the clinical encoder is trained to update code embedding data and non-code embedding data. In some embodiments, the code embedding data represents a particular code embedding data and the non-code embedding data represents a particular non-code embedding space corresponding to embedded representations of any non-code data. The code embedding data in some embodiments is shared with one or more other model(s), for example, a code claims encoder, that similarly updates the code embedding data. In this regard, the code embedding data may be updated as the clinical encoder learns together with a claims encoder. The non-code embedding data in some embodiments is not shared with the claims encoder, such that the clinical encoder only updates the non-code embedding data.

In some embodiments, the method includes training a code decoder based on the code embedding data at operation 1106. In some embodiments, the code decoder is trained by sampling from the code embedding data. The samples of the code embedding data may embody a sampled distribution representative of the embedding space embodied by the code embedding data. In some such embodiments, the code decoder is trained to generate reconstructed code data based on the inputted sampled distribution, for example, where the sampled distribution of the code embedding data represents particular embedded representations sampled from the code embedding data.

In some embodiments, the method includes training a non-code decoder based on the code embedding data at operation 1108. In some embodiments, the non-code decoder is trained by sampling from the non-code embedding data. The samples of the non-code embedding data may embody a sampled distribution representative of the embedding space embodied by the non-code embedding data. In some such embodiments, the non-code decoder is trained to generate reconstructed non-code data or other clinical data based on the inputted sampled distribution, for example, where the sampled distribution of the non-code embedding data represents particular embedded representations sampled from the non-code embedding data.

FIG. 12 illustrates a flowchart depicting example operations of a sub-process for training interconnected variational autoencoder models in a first training scenario in which a training data set includes a set of claims data and a set of clinical data in accordance with at least one embodiment of the present disclosure. The training scenario depicted and described with respect to FIG. 12 in some embodiments corresponds to a circumstance where the training data set is determined to include a set of clinical data and a set of claims data as well. Specifically, FIG. 12 illustrates a process 1200. The process 1200 embodies an example computer-implemented method. In some embodiments, the process 1200 is embodied by computer program code stored on a non-transitory computer-readable storage medium of a computer program product configured for execution to perform the process as depicted and described. Alternatively or additionally, in some embodiments, the process 1200 is performed by one or more specially configured computing devices, such as the predictive computing entity 102 alone or in communication with one or more other component(s), device(s), system(s), and/or the like. In this regard, in some such embodiments, the predictive computing entity 102 is specially configured by computer-coded instructions (e.g., computer program instructions) stored thereon, for example, in the memory element 106 and/or another component depicted and/or described herein and/or otherwise accessible to the predictive computing entity 102, for performing the operations as depicted and described. In some embodiments, the predictive computing entity 102 is in communication with one or more external apparatus(es), system(s), device(s), and/or the like, to perform one or more of the operations as depicted and described. For example, the predictive computing entity 102 in some embodiments is in communication with a separate primary system, client system, and/or the like. For purposes of simplifying the description, the process 1200 is described as performed by and from the perspective of the predictive computing entity 102.

In some embodiments, the process 1200 begins at optional operation 1202. The process 1200 may begin after one or more operational blocks depicted and/or described with respect to any one of the other processes described herein. In this regard, some or all of the process 1200 may replace or supplement one or more operations depicted and/or described with respect to any of the processes described herein. For example, in some embodiments, the process 1200 begins after optional operation 904, and may replace, supplant, and/or otherwise supplement one or more operations of the process 900, such as at least a portion of the operation 906. Upon completion of the process 1200, the flow of operations may terminate. Additionally or alternatively, as depicted, upon completion of the process 1200 in some embodiments, flow may return to one or more operation(s) of another process, such as the operation 906. It will be appreciated that, in some embodiments, the process 1200 embodies a sub-process of one or more other process(es) depicted and/or described herein, for example, the process 900.

Although the example process 1200 depicts a particular sequence of operations, the sequence may be altered without departing from the scope of the present disclosure. For example, some of the operations depicted may be performed in parallel or in a different sequence that does not materially affect the function of the process 1200. In other examples, different components of an example device or system that implements the process 1200 may perform functions at substantially the same time or in a specific sequence.

In some embodiments, the method includes training a clinical encoder based on a set of clinical data at operation 1202. In some embodiments, the clinical encoder is trained to update code embedding data and non-code embedding data. In some embodiments, the code embedding data represents a particular code embedding data and the non-code embedding data represents a particular non-code embedding space corresponding to embedded representations of any non-code data. The code embedding data in some embodiments is shared with one or more other model(s), for example, a code claims encoder, that similarly updates the code embedding data. In this regard, the code embedding data may be updated as the clinical encoder learns together with a claims encoder. The non-code embedding data in some embodiments is not shared with the claims encoder, such that the clinical encoder only updates the non-code embedding data.

In some embodiments, the method includes training a claims encoder based on a set of claims data operation 1204. In some embodiments, the claims encoder is trained to update code embedding data. In some embodiments the code embedding data represents a particular code embedding space. The code embedding data in some embodiments is shared with one or more other model(s), for example, a clinical encoder, that similarly updates the code embedding data. In this regard, the code embedding data may be updated as the claims encoder learns during training.

In some embodiments, the method includes training the code decoder based on the code embedding data at operation 1206. In some embodiments, the code decoder is trained by sampling from the code embedding data. The samples of the code embedding data may embody a sampled distribution representative of the embedding space embodied by the code embedding data. In this regard the code embedding data may represent learnings of both the clinical encoder and the claims encoder, such that encoded representations of particular code data may be learned based on learned pattern(s), trend(s), and/or the like of code data alone and/or code data in conjunction with any non-code data represented in clinical data, for example. In some such embodiments, the code decoder is trained to generate reconstructed codes embodied by imputed code data based on the inputted sampled distribution, for example, where the sampled distribution of the code embedding data represents particular embedded representations sampled from the code embedding data.

In some embodiments, the method includes training the non-code decoder based on the code embedding data and the non-code embedding data at operation 1208. In some embodiments, the non-code decoder is trained by sampling from the non-code embedding data and sampling from the code embedding data. The samples of the non-code embedding data may embody a first sampled distribution representative of the embedding space embodied by the non-code embedding data. Similarly, the code embedding data may embody a second sampled distribution representative of the embedding space embodied by the non-code embedding data. In some such embodiments, the non-code decoder is trained to generate reconstructed non-code data or other clinical data based on the inputted sampled distributions, for example, where the sampled distribution of the non-code embedding data represents particular embedded representations sampled from the non-code embedding data and the sampled distribution of the code embedding data represents particular embedded representations sampled from the code embedding data. In this regard, the non-code decoder may learn from data pattern(s), trend(s), and/or the like between the embedded representations of both non-code data and code data.

VI. Implementations of Embodiments in Other Contexts

It will be appreciated that the implementations of embodiments described above are provided within an example context for purposes of clarity of understanding. Specifically, various embodiments are described with respect to processing of particular types of data, for example claims data and clinical data. Similarly, embodiments of the present disclosure are described with respect to particular variational autoencoders including particular types of encoders for processing such particular types of data, for example claim encoders and clinical encoders. Similarly still, embodiments of the present disclosure are described with respect to particular variational autoencoders including particular types of decoders, for example a code decoder and a non-code decoder. Such example data types and corresponding model implementations are examples provided within the specific context of medical claims data processing.

It will be appreciated that other embodiments may be applied in other contexts. For example, some embodiments of the present disclosure are provided to handle processing of any two types of data, for example where a first set of data is more comprehensive than a second set of data to be processed. In such embodiments for other contexts, the particular pair of interconnected variational autoencoder models may include any first and second encoders that process a first set of data and a second set of data respectively, as well as a first decoder and a second decoder associated with different types of data and/or a first and second embedding data defining distinct embedding spaces updated using the first and/or second encoders. In this regard, it will be appreciated in accordance with the disclosure that the scope and spirit of the disclosure is not limited merely to claim and clinical data, claim encoders and clinical encoders, and/or code decoders and/or non-code decoders.

Specifically, the concepts described herein with respect to FIGS. 3-12 may be generally applied to any such contexts processing such two data types, where one data type is more comprehensive or otherwise complete (e.g., as a trusted source of data) than the other data type. For example, some embodiments train a pair of interconnected variational autoencoder models comprising at least a first variational autoencoder model interconnected at least in part with a second variational autoencoder model, wherein the first variational autoencoder model comprises at least a first encoder and at least a first decoder, wherein the second variational autoencoder model comprises at least a second encoder and a second decoder, and wherein the first encoder corresponds to a first set of data and the second encoder corresponds to a second set of data. The training the pair of interconnected variational autoencoder models comprises at least one of: (i) in a circumstance where the training data set (a) comprises the first set of data and (b) does not comprise the second set of data: training, by the one or more processors, the first encoder based on the first set of data, wherein the first encoder updates first embedding data, and training, by the one or more processors, the first decoder based on the first embedding data generated by the first encoder, (ii) in a circumstance where the training data set (a) comprises the second set of data and (b) does not comprise the first set of data: training, by the one or more processors, the second encoder based on the second set of data, wherein the second encoder updates the first embedding data and second embedding data, training, by the one or more processors, the first decoder based on the first embedding data, and training, by the one or more processors, the second decoder based on the first embedding data, and/or (iii) in a circumstance where the training data set comprises (a) the first set of data and (b) the second set of data: training, by the one or more processors, the second encoder based on the second set of data, wherein the second encoder updates the first embedding data and second embedding data, training, by the one or more processors, the first encoder based on the first set of data, wherein the first encoder updates the first embedding data, training, by the one or more processors, the first decoder based on the first embedding data, and training, by the one or more processors, the second decoder based on the first embedding data and the second embedding data. The first embedding data is shared between the first encoder and the second encoder. Additionally, such embodiments include generating output data based on the second encoder and the first decoder. In some such embodiments, the training and/or generating of output data is performed utilizing the methods depicted and described with respect to FIGS. 3-12 utilizing any such other first set of data and second set of data of any generic data types.

Additionally or alternatively, some embodiments include generating specific first embedding data by applying processable second data, for example of the same data type as the second set of data specifically, to the trained second encoder, and generating imputed first data by applying the specific first embedding data to the trained first decoder.

Additionally or alternatively, some embodiments include identifying a sampled distribution from the first embedding data, for example corresponding to the first set of data specifically of a first data type, and generating synthetic first data (e.g., of said first data type) by at least applying the sampled distribution from the first embedding data to the trained first decoder.

Additionally or alternatively, some embodiments include determining an embedding distance between the first embedding data and the second embedding data, and applying a penalty to at least a first loss function of the first encoder and a second loss function of the second encoder, the penalty generated based on the embedding distance. Such embedding spaces may be generic from claims and clinical data, and instead define different data types (e.g., a first data type and a second data type of the first set of data and the second set of data respectively) where one of the data types is more complete than the other, for example determined or otherwise known to include a more comprehensive set of data values represented in said data (e.g., a list of codes or other expected data values).

Additionally or alternatively, some embodiments include, in a circumstance where the training data set (a) comprises the second set of data and (b) does not comprise the first set of data, training the first decoder based on the first embedding data generated by the first encoder based on updating the second set of data by masking at least a portion of code data in the second set of data.

Additionally or alternatively, some embodiments include, in a circumstance where the training data set (a) comprises the second set of data and (b) does not comprise the first set of data, training the first decoder based on the first embedding data generated by the first encoder includes updating the second set of data by masking at least a portion of code data in the second set of data.

Additionally or alternatively, some embodiments include, in a circumstance where the training data set (a) comprises the second set of data and (b) does not comprise the first set of data, training the second encoder based on the second set of data includes updating the second set of data by masking at least a portion of data in the second set of data.

Additionally or alternatively, some embodiments include, in a circumstance where the training data set (a) comprises the second set of data and (b) does not comprise the first set of data, training the second decoder based on the first embedding data includes updating the second set of data by masking at least a portion of data in the second set of data.

VII. CONCLUSION

Embodiments of the present disclosure can be implemented in various ways, including as computer program products that comprise articles of manufacture. Such computer program products can include one or more software components including, for example, software objects, methods, data structures, or the like. A software component can be coded in any of a variety of programming languages. An illustrative programming language can be a lower-level programming language such as an assembly language associated with a particular hardware architecture and/or operating system platform. A software component comprising assembly language instructions can require conversion into executable machine code by an assembler prior to execution by the hardware architecture and/or platform. Another example programming language can be a higher-level programming language that can be portable across multiple architectures. A software component comprising higher-level programming language instructions can require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages can be executed directly by an operating system or other software component without having to be first transformed into another form. A software component can be stored as a file or other data storage construct. Software components of a similar type or functionally related can be stored together such as, for example, in a particular directory, folder, or library. Software components can be static (e.g., pre-established, or fixed) or dynamic (e.g., created or modified at the time of execution).

A computer program product can include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium can include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium can also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium can also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium can also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium can include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media can be substituted for or used in addition to the computer-readable storage media described above.

As should be appreciated, various embodiments of the present disclosure can also be implemented as methods, apparatus, systems, computing devices, computing entities, and/or the like. As such, embodiments of the present disclosure can take the form of an apparatus, system, computing device, computing entity, and/or the like executing instructions stored on a non-transitory computer-readable storage medium to perform certain steps or operations. Thus, embodiments of the present disclosure can also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations can be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a non-transitory computer-readable storage medium for execution. For example, retrieval, loading, and execution of code can be performed sequentially such that one instruction is retrieved, loaded, and executed at a time. In some exemplary embodiments, retrieval, loading, and/or execution can be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, e.g., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

VIII. Examples

Example 1. A computer-implemented method comprising: receiving, by one or more processors, at least a training data set; training, by the one or more processors, a pair of interconnected variational autoencoder models comprising at least a first variational autoencoder model interconnected at least in part with a second variational autoencoder model, wherein the first variational autoencoder model comprises at least a claims encoder and at least a code decoder, and wherein the second variational autoencoder model comprises at least a clinical encoder and a non-code decoder, wherein training the pair of interconnected variational autoencoder models comprises at least one of: in a circumstance where the training data set (a) comprises a set of claims data and (b) does not comprise a set of clinical data: training, by the one or more processors, the claims encoder based on the set of claims data, wherein the claims encoder updates code embedding data; and training, by the one or more processors, the code decoder based on the code embedding data generated by the claims encoder; in a circumstance where the training data set (a) comprises the set of clinical data and (b) does not comprise the set of claims data; training, by the one or more processors, the clinical encoder based on the set of clinical data, wherein the clinical encoder updates the code embedding data and non-code embedding data; training, by the one or more processors, the code decoder based on the code embedding data; and training, by the one or more processors, the non-code decoder based on the code embedding data; in a circumstance where the training data set comprises (a) the set of claims data and (b) the set of clinical data: training, by the one or more processors, the clinical encoder based on the set of clinical data, wherein the clinical encoder updates the code embedding data and non-code embedding data; training, by the one or more processors, the claims encoder based on the set of claims data, wherein the claims encoder updates the code embedding data; training, by the one or more processors, the code decoder based on the code embedding data; and training, by the one or more processors, the non-code decoder based on the code embedding data and the non-code embedding data, wherein the code embedding data is shared between the claims encoder and the clinical encoder; and generating, by the one or more processors, output data based on the clinical encoder and the code decoder.

Example 2. The computer-implemented method of any of the preceding examples, wherein generating the output data based on the clinical encoder and the code decoder comprises: generating specific code embedding data by applying processable clinical data to the trained clinical encoder; and generating imputed code data by applying the specific code embedding data to the trained code decoder.

Example 3. The computer-implemented method of any of the preceding examples, wherein generating the output data based on the clinical encoder and the code decoder comprises: identifying a sampled distribution from the code embedding data; and generating synthetic code data by at least applying the sampled distribution from the code embedding data to the trained code decoder.

Example 4. The computer-implemented method of any of the preceding examples, wherein the training data set comprises: the set of claims data comprises code data, visit data, and/or financial data associated with at least one healthcare event; the set of clinical data comprises the code data, the visit data, and/or patient data associated with the at least one healthcare event; or the set of clinical data and the set of claims data.

Example 5. The computer-implemented method of any of the preceding examples, wherein the training of the pair of interconnected variational autoencoder models comprises utilizing code data of the set of claims data as a ground truth.

Example 6. The computer-implemented method of any of the preceding examples, further comprising: matching first visit data of at least a portion of the clinical data with second visit data of at least a portion of the claims data to pair the portion of the clinical data with the portion of the claims data.

Example 7. The computer-implemented method of any of the preceding examples, further comprising: determining an embedding distance between the code embedding data and the non-code embedding data; and applying a penalty to at least a first loss function of the claims encoder and a second loss function of the clinical encoder, the penalty generated based on the embedding distance.

Example 8. The computer-implemented method of any of the preceding examples, wherein determining the embedding distance comprises determining the embedding distance utilizing a Bhattacharyya distance algorithm or a Gaussian distance algorithm.

Example 9. The computer-implemented method of any of the preceding examples, wherein in a circumstance where the training data set (a) comprises the set of clinical data and (b) does not comprise the set of claims data, training the code decoder based on the code embedding data generated by the claims encoder comprises: updating the set of clinical data by masking at least a portion of code data in the set of clinical data.

Example 10. The computer-implemented method of any of the preceding examples, wherein in a circumstance where the training data set (a) comprises the set of clinical data and (b) does not comprise the set of claims data, training the clinical encoder based on the set of clinical data comprises: updating the set of clinical data by masking at least a portion of code data in the set of clinical data.

Example 11. The computer-implemented method of any of the preceding examples, wherein in a circumstance where the training data set (a) comprises the set of clinical data and (b) does not comprise the set of claims data, training the non-code decoder based on the code embedding data comprises: updating the set of clinical data by masking at least a portion of code data in the set of clinical data.

Example 12. The computer-implemented method of any of the preceding examples, further comprising: discarding the non-code decoder and the claims encoder.

Example 13. The computer-implemented method of any of the preceding examples, further comprising: outputting the output data via at least one computing device.

Example 14. A computing apparatus comprising memory and one or more processors communicatively coupled to the memory, the one or more processors configured to: receive at least a training data set; train a pair of interconnected variational autoencoder models comprising at least a first variational autoencoder model interconnected at least in part with a second variational autoencoder model, wherein the first variational autoencoder model comprises at least a claims encoder and at least a code decoder, and wherein the second variational autoencoder model comprises at least a clinical encoder and a non-code decoder, wherein training the pair of interconnected variational autoencoder models comprises at least one of: in a circumstance where the training data set (a) comprises a set of claims data and (b) does not comprise a set of clinical data: train the claims encoder based on the set of claims data, wherein the claims encoder updates code embedding data; and train the code decoder based on the code embedding data generated by the claims encoder; in a circumstance where the training data set (a) comprises the set of clinical data and (b) does not comprise the set of claims data; train the clinical encoder based on the set of clinical data, wherein the clinical encoder updates the code embedding data and non-code embedding data; train the code decoder based on the code embedding data; and train the non-code decoder based on the code embedding data; in a circumstance where the training data set comprises (a) the set of claims data and (b) the set of clinical data: train the clinical encoder based on the set of clinical data, wherein the clinical encoder updates the code embedding data and non-code embedding data; train the claims encoder based on the set of claims data, wherein the claims encoder updates the code embedding data; train the code decoder based on the code embedding data; and train the non-code decoder based on the code embedding data and the non-code embedding data, wherein the code embedding data is shared between the claims encoder and the clinical encoder; and generate, by the one or more processors, output data based on the clinical encoder and the code decoder.

Example 15. The computing apparatus of any of the preceding examples, wherein to generate the output data based on the clinical encoder and the code decoder the computing apparatus is configured to: generate specific code embedding data by applying processable clinical data to the trained clinical encoder; and generate imputed code data by applying the specific code embedding data to the trained code decoder.

Example 16. The computing apparatus of any of the preceding examples, wherein to generate the output data based on the clinical encoder and the code decoder the computing apparatus is configured to: identify a sampled distribution from the code embedding data; and generate synthetic code data by at least applying the sampled distribution from the code embedding data to the trained code decoder.

Example 17. The computing apparatus of any of the preceding examples, wherein the training data set comprises: the set of claims data comprises code data, visit data, and/or financial data associated with at least one healthcare event; the set of clinical data comprises the code data, the visit data, and/or patient data associated with the at least one healthcare event; or the set of clinical data and the set of claims data.

Example 18. The computing apparatus of any of the preceding examples, wherein the training of the pair of interconnected variational autoencoder models comprises utilizing code data of the set of claims data as a ground truth.

Example 19. The computing apparatus of any of the preceding examples, further configured to: match first visit data of at least a portion of the clinical data with second visit data of at least a portion of the clinical data with second visit data of at least a portion of the claims data to pair the portion of the clinical data with the portion of the claims data.

Example 20. The computing apparatus of any of the preceding examples, further configured to: determine an embedding distance between the code embedding data and the non-code embedding data; and apply a penalty to at least a first loss function of the claims encoder and a second loss function of the clinical encoder, the penalty generated based on the embedding distance.

Example 21. The computing apparatus of any of the preceding examples, wherein determining the embedding distance comprises determining the embedding distance utilizing a Bhattacharyya distance algorithm or a Gaussian distance algorithm.

Example 22. The computing apparatus of any of the preceding examples, wherein in a circumstance where the training data set (a) comprises the set of clinical data and (b) does not comprise the set of claims data, to train the code decoder based on the code embedding data generated by the claims encoder the apparatus is configured to: update the set of clinical data by masking at least a portion of code data in the set of clinical data.

Example 23. The computing apparatus of any of the preceding examples, wherein in a circumstance where the training data set (a) comprises the set of clinical data and (b) does not comprise the set of claims data, to train the clinical encoder based on the set of clinical data the computing apparatus is configured to: update the set of clinical data by masking at least a portion of code data in the set of clinical data.

Example 24. The computing apparatus of any of the preceding examples, wherein in a circumstance where the training data set (a) comprises the set of clinical data and (b) does not comprise the set of claims data, to train the non-code decoder based on the code embedding data the computing apparatus is configured to: update the set of clinical data by masking at least a portion of code data in the set of clinical data.

Example 25. The computing apparatus of any of the preceding examples, further configured to: discard the non-code decoder and the claims encoder.

Example 26. The computing apparatus of any of the preceding examples, further configured to: output the output data via at least one computing device.

Example 27. One or more non-transitory computer-readable storage media including instructions that, when executed by one or more processors, cause the one or more processors to: receive at least a training data set; train a pair of interconnected variational autoencoder models comprising at least a first variational autoencoder model interconnected at least in part with a second variational autoencoder model, wherein the first variational autoencoder model comprises at least a claims encoder and at least a code decoder, and wherein the second variational autoencoder model comprises at least a clinical encoder and a non-code decoder, wherein training the pair of interconnected variational autoencoder models comprises at least one of: in a circumstance where the training data set (a) comprises a set of claims data and (b) does not comprise a set of clinical data: train the claims encoder based on the set of claims data, wherein the claims encoder updates code embedding data; and train the code decoder based on the code embedding data generated by the claims encoder; in a circumstance where the training data set (a) comprises the set of clinical data and (b) does not comprise the set of claims data; train the clinical encoder based on the set of clinical data, wherein the clinical encoder updates the code embedding data and non-code embedding data; train the code decoder based on the code embedding data; and train the non-code decoder based on the code embedding data; in a circumstance where the training data set comprises (a) the set of claims data and (b) the set of clinical data: train the clinical encoder based on the set of clinical data, wherein the clinical encoder updates the code embedding data and non-code embedding data; train the claims encoder based on the set of claims data, wherein the claims encoder updates the code embedding data; train the code decoder based on the code embedding data; and train the non-code decoder based on the code embedding data and the non-code embedding data, wherein the code embedding data is shared between the claims encoder and the clinical encoder; and generate output data based on the clinical encoder and the code decoder.

Example 28. The one or more non-transitory computer-readable storage media of any of the preceding examples, wherein to generate the output data based on the clinical encoder and the code decoder the one or more non-transitory computer-readable storage media comprises: generate specific code embedding data by applying processable clinical data to the trained clinical encoder; and generate imputed code data by applying the specific code embedding data to the trained code decoder.

Example 29. The one or more non-transitory computer-readable storage media of any of the preceding examples, wherein to generate the output data based on the clinical encoder and the code decoder the one or more non-transitory computer-readable storage media is caused to: identify a sampled distribution from the code embedding data; and generate synthetic code data by at least applying the sampled distribution from the code embedding data to the trained code decoder.

Example 30. The one or more non-transitory computer-readable storage media of any of the preceding examples, wherein the training data set comprises: the set of claims data comprises code data, visit data, and/or financial data associated with at least one healthcare event; the set of clinical data comprises the code data, the visit data, and/or patient data associated with the at least one healthcare event; or the set of clinical data and the set of claims data.

Example 31. The one or more non-transitory computer-readable storage media of any of the preceding examples, wherein the training of the pair of interconnected variational autoencoder models comprises utilizing code data of the set of claims data as a ground truth.

Example 32. The one or more non-transitory computer-readable storage media of any of the preceding examples, further caused to: match first visit data of at least a portion of the clinical data with second visit data of at least a portion of the claims data to pair the portion of the clinical data with the portion of the claims data.

Example 33. The one or more non-transitory computer-readable storage media of any of the preceding examples, further caused to: determine an embedding distance between the code embedding data and the non-code embedding data; and apply a penalty to at least a first loss function of the claims encoder and a second loss function of the clinical encoder, the penalty generated based on the embedding distance.

Example 34. The one or more non-transitory computer-readable storage media of any of the preceding examples, wherein determining the embedding distance comprises determining the embedding distance utilizing a Bhattacharyya distance algorithm or a Gaussian distance algorithm.

Example 35. The one or more non-transitory computer-readable storage media of any of the preceding examples, wherein in a circumstance where the training data set (a) comprises the set of clinical data and (b) does not comprise the set of claims data, to train the code decoder based on the code embedding data generated by the claims encoder the one or more non-transitory computer-readable storage media is caused to: update the set of clinical data by masking at least a portion of code data in the set of clinical data.

Example 36. The one or more non-transitory computer-readable storage media of any of the preceding examples, wherein in a circumstance where the training data set (a) comprises the set of clinical data and (b) does not comprise the set of claims data, to train the clinical encoder based on the set of clinical data the one or more non-transitory computer-readable storage media is caused to: update the set of clinical data by masking at least a portion of code data in the set of clinical data.

Example 37. The one or more non-transitory computer-readable storage media of any of the preceding examples, wherein in a circumstance where the training data set (a) comprises the set of clinical data and (b) does not comprise the set of claims data, to train the non-code decoder based on the code embedding data the one or more non-transitory computer-readable storage media is caused to: update the set of clinical data by masking at least a portion of code data in the set of clinical data.

Example 38. The one or more non-transitory computer-readable storage media of any of the preceding examples, further caused to: discard the non-code decoder and the claims encoder.

Example 39. The one or more non-transitory computer-readable storage media of any of the preceding examples, further caused to: output the output data via at least one computing device.

The invention claimed is:

1. A computer-implemented method comprising:

receiving, by one or more processors, at least a training data set;

training, by the one or more processors, a pair of interconnected variational autoencoder models comprising at least a first variational autoencoder model interconnected at least in part with a second variational autoencoder model, wherein the first variational autoencoder model comprises at least a first encoder and at least a first decoder, wherein the second variational autoencoder model comprises at least a second encoder and a second decoder, wherein the first encoder corresponds to a first set of data and the second encoder corresponds to a second set of data, and wherein training the pair of interconnected variational autoencoder models comprises at least one of:

in a circumstance where the training data set (a) comprises the first set of data and (b) does not comprise the second set of data:

training, by the one or more processors, the first encoder based on the first set of data, wherein the first encoder updates first embedding data; and training, by the one or more processors, the first decoder based on the first embedding data generated by the first encoder;

in a circumstance where the training data set (a) comprises the second set of data and (b) does not comprise the first set of data;

training, by the one or more processors, the second encoder based on the second set of data, wherein the second encoder updates the first embedding data and second embedding data;

training, by the one or more processors, the first decoder based on the first embedding data; and training, by the one or more processors, the second decoder based on the first embedding data;

in a circumstance where the training data set comprises (a) the first set of data and (b) the second set of data:

training, by the one or more processors, the second encoder based on the second set of data, wherein the second encoder updates the first embedding data and the second embedding data;

training, by the one or more processors, the first encoder based on the first set of data, wherein the first encoder updates the first embedding data;

training, by the one or more processors, the first decoder based on the first embedding data; and training, by the one or more processors, the second decoder based on the first embedding data and the second embedding data;

wherein the first embedding data is shared between the first encoder and the second encoder; and generating, by the one or more processors, output data based on the second encoder and the first decoder.

2. The computer-implemented method of claim 1, wherein generating the output data based on the second encoder and the first decoder comprises:

generating specific first embedding data by applying processable second data to the trained second encoder; and generating imputed first data by applying the specific first embedding data to the trained first decoder.

3. The computer-implemented method of claim 1, wherein generating the output data based on the second encoder and the first decoder comprises:

identifying a sampled distribution from the first embedding data; and generating synthetic first data by at least applying the sampled distribution from the first embedding data to the trained first decoder.

4. The computer-implemented method of claim 1, wherein the training data set comprises:

the first set of data comprises code data, visit data, and/or financial data associated with at least one healthcare event;

the second set of data comprises the code data, the visit data, and/or patient data associated with the at least one healthcare event; or the second set of data and the first set of data.

5. The computer-implemented method of claim 1, wherein the training of the pair of interconnected variational autoencoder models comprises utilizing code data of the first set of data as a ground truth.

6. The computer-implemented method of claim 1, further comprising:

matching first visit data of at least a portion of the second set of data with second visit data of at least a portion of the first set of data to pair the portion of the second set of data with the portion of the first set of data.

7. The computer-implemented method of claim 1, further comprising:

determining an embedding distance between the first embedding data and the second embedding data; and applying a penalty to at least a first loss function of the first encoder and a second loss function of the second encoder, the penalty generated based on the embedding distance.

8. The computer-implemented method of claim 7, wherein determining the embedding distance comprises determining the embedding distance utilizing a Bhattacharyya distance algorithm or a Gaussian distance algorithm.

9. The computer-implemented method of claim 1, wherein in a circumstance where the training data set (a) comprises the second set of data and (b) does not comprise the first set of data, training the first decoder based on the first embedding data generated by the first encoder comprises:

updating the second set of data by masking at least a portion of code data in the second set of data.

10. The computer-implemented method of claim 1, wherein in a circumstance where the training data set (a) comprises the second set of data and (b) does not comprise the first set of data, training the second encoder based on the second set of data comprises:

updating the second set of data by masking at least a portion of data in the second set of data.

11. The computer-implemented method of claim 1, wherein in a circumstance where the training data set (a) comprises the second set of data and (b) does not comprise the first set of data, training the second decoder based on the first embedding data comprises:

updating the second set of data by masking at least a portion of data in the second set of data.

12. The computer-implemented method of claim 1, further comprising:

discarding the second decoder and the first encoder.

13. The computer-implemented method of claim 1, further comprising:

outputting the output data via at least one computing device.

14. A computing apparatus comprising memory and one or more processors communicatively coupled to the memory, the one or more processors configured to:

receive at least a training data set;

train a pair of interconnected variational autoencoder models comprising at least a first variational autoencoder model interconnected at least in part with a second variational autoencoder model, wherein the first variational autoencoder model comprises at least a first encoder and at least a first decoder, wherein the second variational autoencoder model comprises at least a second encoder and a second decoder, and wherein training the pair of interconnected variational autoencoder models comprises at least one of:

in a circumstance where the training data set (a) comprises a first set of data and (b) does not comprise a second set of data:

train the first encoder based on the first set of data, wherein the first encoder updates first embedding data; and train the first decoder based on the first embedding data generated by the first encoder;

in a circumstance where the training data set (a) comprises the second set of data and (b) does not comprise the first set of data;

train the second encoder based on the second set of data, wherein the second encoder updates the first embedding data and second embedding data;

train the first decoder based on the first embedding data; and train the second decoder based on the first embedding data;

in a circumstance where the training data set comprises (a) the first set of data and (b) the second set of data:

train the second encoder based on the second set of data, wherein the second encoder updates the first embedding data and second embedding data;

train the first encoder based on the first set of data, wherein the first encoder updates the first embedding data;

train the first decoder based on the first embedding data; and train the second decoder based on the first embedding data and the second embedding data, wherein the first embedding data is shared between the first encoder and the second encoder; and generate, by the one or more processors, output data based on the second encoder and the first decoder.

15. The computing apparatus of claim 14, wherein to generate the output data based on the second encoder and the first decoder the computing apparatus is configured to:

generate specific first embedding data by applying processable second data to the trained second encoder; and generate imputed first data by applying the specific first embedding data to the trained first decoder.

16. The computing apparatus of claim 14, wherein to generate the output data based on the second encoder and the first decoder the computing apparatus is configured to:

identify a sampled distribution from the first embedding data; and generate synthetic first data by at least applying the sampled distribution from the first embedding data to the trained first decoder.

17. The computing apparatus of claim 14, wherein the training data set comprises:

the first set of data comprises code data, visit data, and/or financial data associated with at least one healthcare event;

the second set of data comprises the code data, the visit data, and/or patient data associated with the at least one healthcare event; or the second set of data and the first set of data.

18. The computing apparatus of claim 14, further caused to:

match first visit data of at least a portion of the second set of data with second visit data of at least a portion of the first set of data to pair the portion of the second set of data with the portion of the first set of data.

19. The computing apparatus of claim 14, further caused to:

determine an embedding distance between the first embedding data and the second embedding data; and apply a penalty to at least a first loss function of the first encoder and a second loss function of the second encoder, the penalty generated based on the embedding distance.

20. One or more non-transitory computer-readable storage media including instructions that, when executed by one or more processors, cause the one or more processors to:

receive at least a training data set;

train a pair of interconnected variational autoencoder models comprising at least a first variational autoencoder model interconnected at least in part with a second variational autoencoder model, wherein the first variational autoencoder model comprises at least a first encoder and at least a first decoder, wherein the second variational autoencoder model comprises at least a second encoder and a second decoder, and wherein training the pair of interconnected variational autoencoder models comprises at least one of:

in a circumstance where the training data set (a) comprises a first set of data and (b) does not comprise a second set of data:

train the first encoder based on the first set of data, wherein the first encoder updates first embedding data; and train the first decoder based on the first embedding data generated by the first encoder;

in a circumstance where the training data set (a) comprises the second set of data and (b) does not comprise the first set of data;

train the second encoder based on the second set of data, wherein the second encoder updates the first embedding data and second embedding data;

train the first decoder based on the first embedding data; and train the second decoder based on the first embedding data;

in a circumstance where the training data set comprises (a) the first set of data and (b) the second set of data:

train the second encoder based on the second set of data, wherein the second encoder updates the first embedding data and the second embedding data;

train the first encoder based on the first set of data, wherein the first encoder updates the first embedding data;

train the first decoder based on the first embedding data; and train the second decoder based on the first embedding data and the second embedding data, wherein the first embedding data is shared between the first encoder and the second encoder; and generate, by the one or more processors, output data based on the second encoder and the first decoder.

* * * * *